United States Patent
Rogers et al.

(10) Patent No.: US 11,487,551 B2
(45) Date of Patent: *Nov. 1, 2022

(54) SYSTEM AND METHOD FOR KEY VALUE STORE

(71) Applicant: Meta Platforms Technologies, LLC, Menlo Park, CA (US)

(72) Inventors: Andrew M. Rogers, Bellevue, WA (US); Arthur Zwiegincew, Medina, WA (US)

(73) Assignee: Meta Platforms Technologies, LLC, Menlo Park, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/313,965

(22) Filed: May 6, 2021

(65) Prior Publication Data

US 2021/0279067 A1 Sep. 9, 2021

Related U.S. Application Data

(63) Continuation of application No. 16/561,834, filed on Sep. 5, 2019, now Pat. No. 11,169,816.

(51) Int. Cl.
*G06F 9/4401* (2018.01)
*G06F 21/62* (2013.01)

(52) U.S. Cl.
CPC ........ *G06F 9/4401* (2013.01); *G06F 21/6218* (2013.01)

(58) Field of Classification Search
None
See application file for complete search history.

(56) References Cited

U.S. PATENT DOCUMENTS

| | | | | |
|---|---|---|---|---|
| 6,523,058 B1* | 2/2003 | Fung | ...................... | G06F 9/4843 709/227 |
| 7,140,015 B1* | 11/2006 | Bhanjois | ................. | G06F 9/546 718/107 |
| 9,697,144 B1* | 7/2017 | Chen | ........................ | G06F 9/455 |
| 9,703,582 B1* | 7/2017 | Chigurapati | ........ | G06F 9/45558 |
| 11,169,816 B2* | 11/2021 | Rogers | ................ | G06F 21/6218 |
| 2004/0123063 A1* | 6/2004 | Dalal | ..................... | G06F 3/0631 711/170 |
| 2012/0110572 A1* | 5/2012 | Kodi | ................... | G06F 9/45558 718/1 |

(Continued)

*Primary Examiner* — Umut Onat
(74) *Attorney, Agent, or Firm* — Baker Botts L.L.P.

(57) ABSTRACT

In certain embodiments, a method includes starting an application as a first process within a user space of an operating system. The application instantiates a key-value store library associated with the operating system. The method also includes managing, by a block device service running within the user space, one or more first data blocks of a persistent storage device allocated to the key-value store library. In addition, the method includes receiving, by a kernel of the operating system, a system call request comprising an access request generated by the key-value store library. The method further includes granting, by the block device service, and in response to the access request, the key-value store library access to the one or more first data blocks through an inter process communication channel between the application and the block device service via the kernel.

20 Claims, 12 Drawing Sheets

(56) References Cited

U.S. PATENT DOCUMENTS

| | | | |
|---|---|---|---|
| 2013/0061250 A1* | 3/2013 | Kothandapani | G06F 9/44 719/320 |
| 2016/0041918 A1* | 2/2016 | Jeong | G06F 16/1847 711/103 |
| 2017/0097873 A1* | 4/2017 | Krishnamachari | G06F 11/1474 |
| 2017/0168936 A1* | 6/2017 | Chandrashekar | G06F 12/0802 |
| 2018/0260324 A1* | 9/2018 | Marathe | G06F 12/0804 |
| 2019/0065096 A1* | 2/2019 | Sterin | G06F 9/45533 |
| 2019/0087431 A1* | 3/2019 | Qiu | G06F 16/137 |
| 2020/0364100 A1* | 11/2020 | Shah | G06F 3/0673 |

* cited by examiner

SYSTEM AND METHOD FOR KEY VALUE STORE

PRIORITY

This application is a continuation under 35 U.S.C. § 120 of U.S. patent application Ser. No. 16/561,834, filed 5 Sep. 2019, now issued as U.S. Pat. No. 11,169,816 on 9 Nov. 2021, which is incorporated herein by reference.

TECHNICAL FIELD

This disclosure generally relates to the management of one or more applications on a device, and access to physical hardware of the underlying device granted to those applications.

BACKGROUND

A mobile computing device—such as a smartphone, tablet computer, or laptop computer—can include functionality for determining its location, direction, or orientation, such as a GPS receiver, compass, gyroscope, or accelerometer. Such a device can also include functionality for wireless communication, such as BLUETOOTH communication, near-field communication (NFC), or infrared (IR) communication or communication with a wireless local area networks (WLANs) or cellular-telephone network. Such a device can also include one or more cameras, scanners, touchscreens, microphones, or speakers. Mobile computing devices can also execute software applications, such as games, web browsers, or social-networking applications. With social-networking applications, users can connect, communicate, and share information with other users in their social networks.

A mobile computing device, or any other computing device, can service as a host for one or more applications, also referred to as a client application. The applications can run on one or more virtual machines that operate on the computing device. For security purposes, the applications are generally restricted from directly accessing the underlying hardware of the computing device. A kernel can be placed between the underlying hardware and the applications to help manage communication and resource allocation of the underlying hardware. Given its function, the kernel has a high level of privilege that allows it to facilitate the allocation of device resources to the client applications.

SUMMARY OF PARTICULAR EMBODIMENTS

The purpose and advantages of the disclosed subject matter will be set forth in the description that follows. Additional advantages of the disclosed subject matter will be realized and attained by the methods and systems particularly pointed out in the written description and claims, as well as from the appended drawings.

Embodiments of the invention can include or be implemented in conjunction with an artificial reality system. Artificial reality is a form of reality that has been adjusted in some manner before presentation to a user, which can include, e.g., a virtual reality (VR), an augmented reality (AR), a mixed reality (MR), a hybrid reality, or some combination and/or derivatives thereof. Artificial reality content can include completely generated content or generated content combined with captured content (e.g., real-world photographs). The artificial reality content can include video, audio, haptic feedback, or some combination thereof, and any of which can be presented in a single channel or in multiple channels (such as stereo video that produces a three-dimensional effect to the viewer). Additionally, in some embodiments, artificial reality can be associated with applications, products, accessories, services, or some combination thereof, that are, e.g., used to create content in an artificial reality and/or used in (e.g., perform activities in) an artificial reality. The artificial reality system that provides the artificial reality content can be implemented on various platforms, including a head-mounted display (HMD) connected to a host computer system, a standalone HMD, a computing device or computing system, or any other hardware platform capable of providing artificial reality content to one or more viewers In certain embodiments, a method or system can be used to allow a key value store to bypass the file store service or system. In such embodiments the key value store can communicate with the persistent storage device without having to first message the file store service or system. For example, the key value store can be used to manage an application's ability to write or read on the persistent storage device. The key value store can be instantiated in the one or more applications. In some embodiments, the application can instantiate a key value store and/or a file store service. The application can then select whether to use the key value store or the file store service to access the persistent storage device.

In certain embodiments, a method or system can be used to allow one or more applications running on the computing device to access the underlying hardware of the computing device using reduced resources. For example, a microkernel can be used to provide client applications access to a disk driver located in the kernel. To help to reduce the amount communication processed by the microkernel, each client application can be supplied with a key value store or a file system that can be instantiated within the application's own process. The key value store or the file system being instantiated within the application can help the one or more client applications to interact with the underlying hardware of the computing device, also referred to as the persistent storage device. In addition, having the key value store and/or the file system instantiated within the client application can allow a user to selectively use either the key value store or the file system to access the persistent storage device, depending on which data blocks the user means to access, read, and/or write.

When using a microkernel, certain embodiments utilize a block device service located in the user space services. The block device service can host the disk driver that provides access to the underlying hardware of the computing device. To obtain access to the underlying hardware of the computing system, in certain embodiments, a key value store or a file system library located in the one or more client applications can communicate with the microkernel using an IPC channel. A logical volume service can be used to allocate data blocks of the persistent storage device to the key value store and/or the file system, while a block device service can be used to manage the allocated data blocks.

In certain embodiments a method by a computing device can starting an application as a first process within a user space of an operating system. The application can instantiate a key-value store and a file system associated with the operating system. The method can also include managing, by a block device service running as a second process within the user space of the operating system, one or more first data blocks of a persistent storage allocated to the key value store and one or more second data blocks of the persistent storage allocated to the file system. In addition, the method can include receiving, by a kernel of the operating system, a system call request generated by the key-value store or the file system. The system call request can comprise an access request to access the persistent storage of the computing device. Further, the method can include granting, by the block device service and in response to the access request, the key value store access to the one or more first data blocks or the file system access to the one or more second data blocks.

In some embodiments, the kernel can send the access request, in response to the system call request, to the block device service. The kernel can be a microkernel or a monolithic kernel. The block device service can start as the second process within the user space of the operating system. The block device service can be configured to manage the persistent storage device of the computing device. The key value store and the file system, in response to the system call request, can be provided access to the one or more first data blocks or the one or more second data blocks through an inter process communication (IPC) channel, for example. In certain embodiment the key value store may be used to read or write data on the one or more first data blocks, while the file system can be used to read or write on the one or more second data blocks of the persistent storage device. The key value store manages the one or more first data blocks using a log-structured merge-tree. The key value store and the file storage system can include an internal structure indicating the location of the one or more first data blocks or the one or more second data blocks in the persistent storage device.

In some non-limiting embodiments, the application can send a request to a logical volume service during set-up of the application. In response, the logical volume service can allocate the one or more first data blocks of the persistent storage device for the key value store, and the one or more second data blocks at the persistent storage device for the file system. The logical volume service can inform the block device service of the allocation of the one or more first data blocks and the one or more second data blocks at the persistent storage device. This can allow the block device service to manage the data blocks of the persistent storage device of the computing device. The application can read or write data on the data block of the persistent storage device based on the provided access to the block device service. In certain embodiments the logical volume service allocates the one or more data blocks to two different applications, meaning that the application can share the one or more data blocks.

In certain embodiments, one or more computer-readable non-transitory storage media embodying software that is operable when executed to start an application as a first process within a user space of an operating system. The application can instantiate a key-value store and a file system associated with the operating system. The software can also be operable to manage, by a block device service running as a second process within the user space of the operating system, one or more first data blocks of a persistent storage allocated to the key value store and one or more second data blocks of the persistent storage allocated to the file system. In addition, the software can be operable to receive, by a kernel of the operating system, a system call request generated by the key-value store or the file system. The system call request can include an access request to access the persistent storage of the computing device. Further, the software can be operable to grant, by the block device service and in response to the access request, the key value store access to the one or more first data blocks or the file system access to the one or more second data blocks.

In certain embodiments, a system comprising one or more processors, and one or more computer-readable non-transitory storage media coupled to one or more of the processors. The system comprises instructions operable when executed by one or more of the processors to cause the system to start an application as a first process within a user space of an operating system. The application can instantiate a key-value store and a file system associated with the operating system. The system can also comprise instructions operable when executed by one or more of the processors to cause the system to manage, by a block device service running as a second process within the user space of the operating system, one or more first data blocks of a persistent storage allocated to the key value store and one or more second data blocks of the persistent storage allocated to the file system. In addition, the system can comprise instructions operable when executed by one or more of the processors to cause the system to receive, by a kernel of the operating system, a system call request generated by the key-value store or the file system. The system call request can include an access request to access the persistent storage of the computing device. Further, the system can comprise instructions operable when executed by one or more of the processors to cause the system to grant, by the block device service and in response to the access request, the key value store access to the one or more first data blocks or the file system access to the one or more second data blocks.

The embodiments disclosed herein are only examples, and the scope of this disclosure is not limited to them. Particular embodiments can include all, some, or none of the components, elements, features, functions, operations, or steps of the embodiments disclosed herein. Embodiments according to the invention are disclosed in the attached claims directed to a method, a storage medium, a system and a computer program product, wherein any feature mentioned in one claim category, e.g. method, can be claimed in another claim category, e.g. system, as well. The dependencies or references back in the attached claims are chosen for formal reasons only. However, any subject matter resulting from a deliberate reference back to any previous claims (in particular multiple dependencies) can be claimed as well, so that any combination of claims and the features thereof are disclosed and can be claimed regardless of the dependencies chosen in the attached claims. The subject-matter which can be claimed comprises not only the combinations of features as set out in the attached claims but also any other combination of features in the claims, wherein each feature mentioned in the claims can be combined with any other feature or combination of other features in the claims. Furthermore, any of the embodiments and features described or depicted herein can be claimed in a separate claim and/or in any combination with any embodiment or feature described or depicted herein or with any of the features of the attached claims.

DESCRIPTION OF EXAMPLE EMBODIMENTS

A computing device, such as an augmented reality device, can reduce the amount of resources expended to provide one or more applications running on the device access to the underlying hardware. For example, when a kernel operating on the device is a microkernel, some embodiments can replace the centralized file server, which can operate as a user space service. Instead, certain embodiments can employ one or more applications that include or instantiate a data storage system, such as a file system library or a key value store, associated with the operating system. The data storage system being included within the one or more applications can help to reduce the amount of communications processed by the microkernel, as well as the number of IPC channels, as discussed below.

Figure 8:
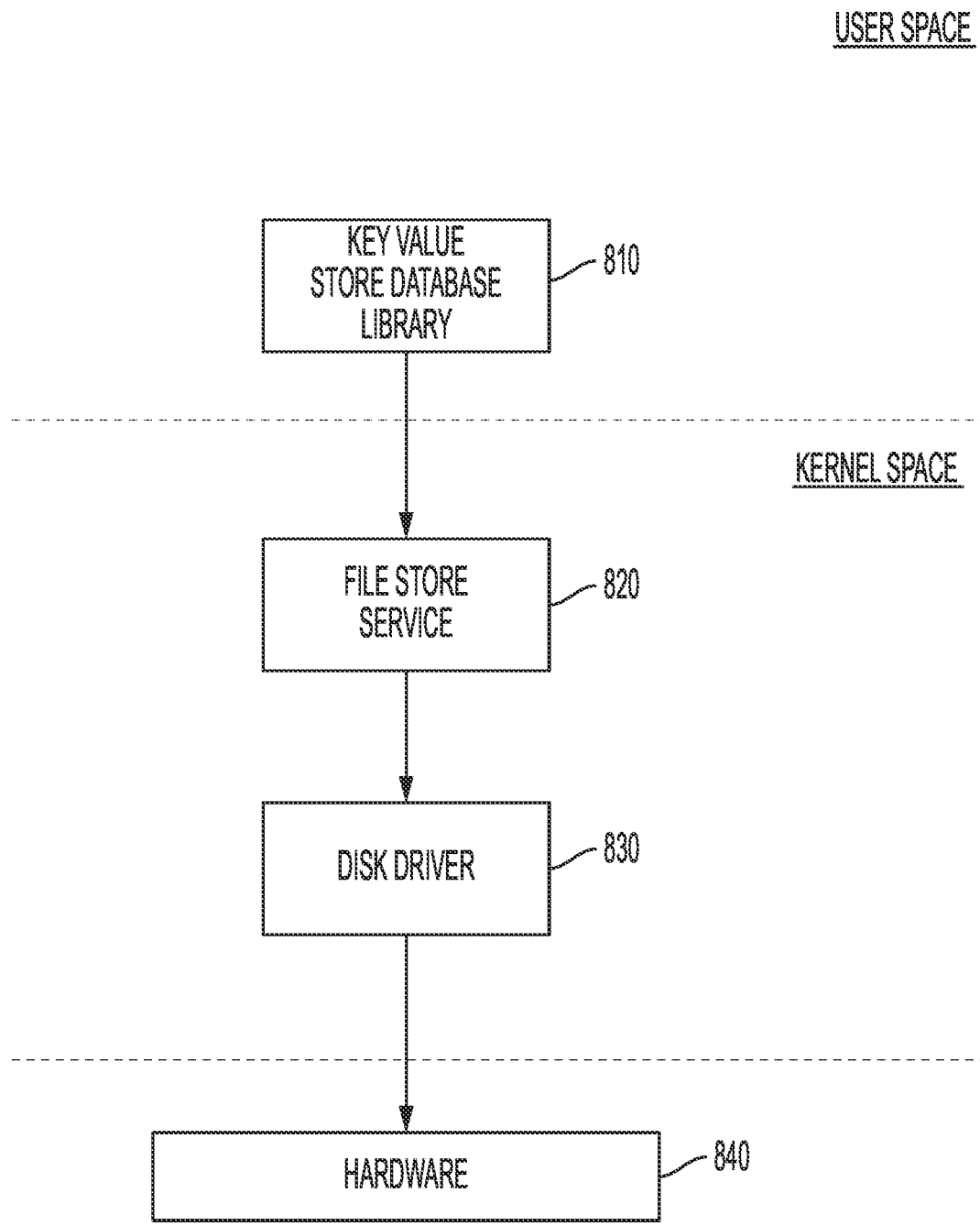
FIG. 8 illustrates an example of a key value store running on a computing device.

In some other embodiments, the amount of resources expended by the computing device can also be reduced by removing the file system all together, and instead relying on the key value store for mapping a virtual storage space to one or more storage blocks of the underlying hardware of the device. Doing so can allow a client application operating on the computing device to read and write to the persistent storage device, such as a disk driver, using the key value storage. The key value store can be instantiated in the client applications, further reducing the amount of processing undergone by the microkernel, as discussed below. In certain embodiments, the key value store and the file system library can be instantiated in one or more applications, allowing an application to select whether to use the key value store of the file system library for a given operation. In such embodiments, the key value store and the file system library can be peers, located in the same space, as opposed to the key value store being located on top of the file system library, as shown in FIG. 8.

A kernel is generally a software-based program used by an operating system of a computing device to connect software applications running on the computing device to the underlying hardware. Given its access to the underlying hardware, the kernel generally runs in a privilege mode. In certain embodiments, a kernel can be either a monolithic kernel or a microkernel. When using a monolithic kernel, many or all of the services provided for by the operating system can be included inside the kernel. For example, the kernel can include a data storage system, such as a file system library or key value store, a scheduler for virtual memory, and a device driver. Given that many or all of the services provided for by the operating system are included within the monolithic kernel, the monolithic kernel can be large in size. On the other hand, a microkernel includes minimal functionality for implementing an operating system, for example, such as a low-complexity memory management and/or IPC channel code. All other functionalities of the operating system can be removed from the within kernel and instead relocated to operate as separate services in the user space outside the kernel. For example, the microkernel can communicate with a file server and/or a block device service, also referred to as a device driver service, located in the user space. The one or more client applications can communicate with any of the services located in the user space through the microkernel using IPC channels. IPC channels can allow for communication via the microkernel between the different user services and/or between the one or more applications and a given user service.

Figure 1:
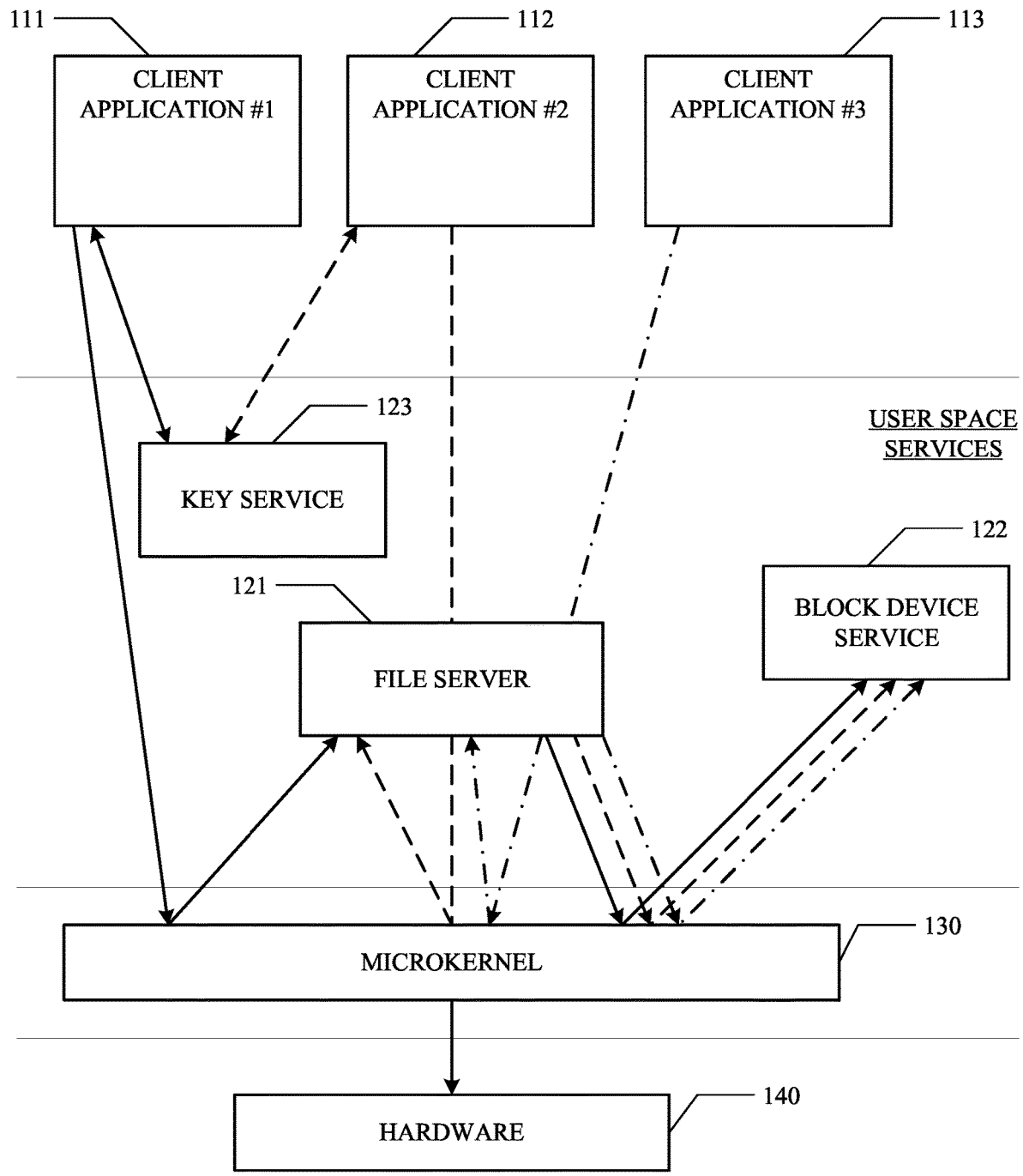
FIG. 1 illustrates an example of client applications running on a computing device.

FIG. 1 illustrates an example of client applications running on a computing device. In particular, FIG. 1 illustrates an embodiment of a computing device that utilizes a centralized file server. As shown in FIG. 1, a computing device can include hardware 140 and a microkernel 130 connecting hardware 140 to the operating system running on the device. In one non-limiting example, the operating system can run on a virtual machine operating on the computing device. Because the computing device shown in FIG. 1 uses a microkernel, a plurality of services can operate in the user space rather than being located in the kernel itself. The microkernel can interface between the user space services and the client applications. As shown in FIG. 1, three applications 111, 112, 113 can operate in the user space. In certain other embodiments, any other number of applications can operate within the user space.

FIG. 1 illustrates three services operating in the user space. For example, centralized file server or file host system 121 can be used to provide all of the client applications access to the disk driver. In certain embodiments, file server 121 can be a trusted user space service with a high level of privilege that allows the server to control how data is stored and retrieved on the computing device. File server 121 can help separate and store inputted data in the memory of the computing device. When a client application, for example, requests to access the stored data, file server 121 can provide an address indicating the location of the stored data. Using the provided address an application can retrieve the stored data from the memory of the computing device. In one non-limiting example, when a virtual machine running a virtual operating system is operating on a computing device, file server 121 can help direct the virtual machine, and the virtual addresses produced therein, to the underlying addresses reflecting the underlying memory of the computing device. In other words, file server 121 can map a virtual storage space to one or more storage blocks of the underlying hardware of the computing device. In some embodiments, file server 121 can be a virtual file server.

File server 121 can serve as a centralized file system host service located outside of the microkernel. To access the persistent storage of the device, applications 111, 112, and 113 shown in FIG. 1 need to communicate with the centralized file system host service 121 via an IPC channel. Centralized file system host service 121 would then communicate with block device service 122 via another IPC channel. Block device service 122, also referred to as a disk drive service, can also be included within the user space of the computing device. Block device service 122 can help manage access to the persistent storage device, also known as memory or disk driver of the underlying device. To interact with the persistent storage device a client application can send a request to block device service 122, which can then grant or deny the request.

A key service 123, also referred to as a key value store, can be included as a user space service. Key service 123 can be used, along with file server 121, to provide client applications access to the persistent storage device. In other words, key service 123 can map a virtual storage space to one or more storage blocks of the underlying hardware of the computing device. While file server 121 uses addresses, key service 123 uses a dictionary or a hash table to link a key to a storage location of the data in the memory. Each of client applications 111, 112, 113 can communicate with key service 123 using IPC channels via the microkernel or using a separate channel that does not pass through the microkernel.

As shown in FIG. 1, a two-hop communication is used to provide the client application access to the underlying persistent storage of the computing device. For example, in the embodiments shown in FIG. 1, client application 111 sends a message to microkernel 130 requesting access to a data block of the persistent storage device. The message can take the form of a system call received by microkernel 130 from client application 111. Microkernel 130 can then send a message to file server 121 on behalf of client application 111. The connection between client application 111 and file server 121 through the microkernel can be considered a first IPC channel. File server 121 can retrieve the address of the requested data block in the persistent storage device and forward the address to microkernel 130. Microkernel 130 can then send a communication, including the retrieved address to block device service 122. Block device service 122 can then provide client application 111 access to the requested persistent storage of the computing device, also referred to as a persistent storage device. The connection between file server 121 and block device service 122 through microkernel 130 can be considered a second IPC channel. Each of client applications 111, 112, and 113 communicates with centralized file server 121 to access block device service 122, as shown in the lines of FIG. 1.

As discussed above, in the computing device shown in FIG. 1 accessing the data block of the persistent storage device can require the use of two different IPC channels through the microkernel—a first channel between the client application and the file server and a second channel between the file server and the block device service. This two-hop communication, which includes two different IPC channels, can require a lot of overhead and host resources, which translated to power consumption. In addition, the computing device shown in FIG. 1 requires the transmission of plain text data from client applications 111, 112, 113 to the centralized file server 121. The plain text data can then be encrypted at file server 121 and transmitted to block device service 122. This plain text transmission of data from the client application to the file server can create a security vulnerability, which allows malicious actors to access the data.

Figure 2:
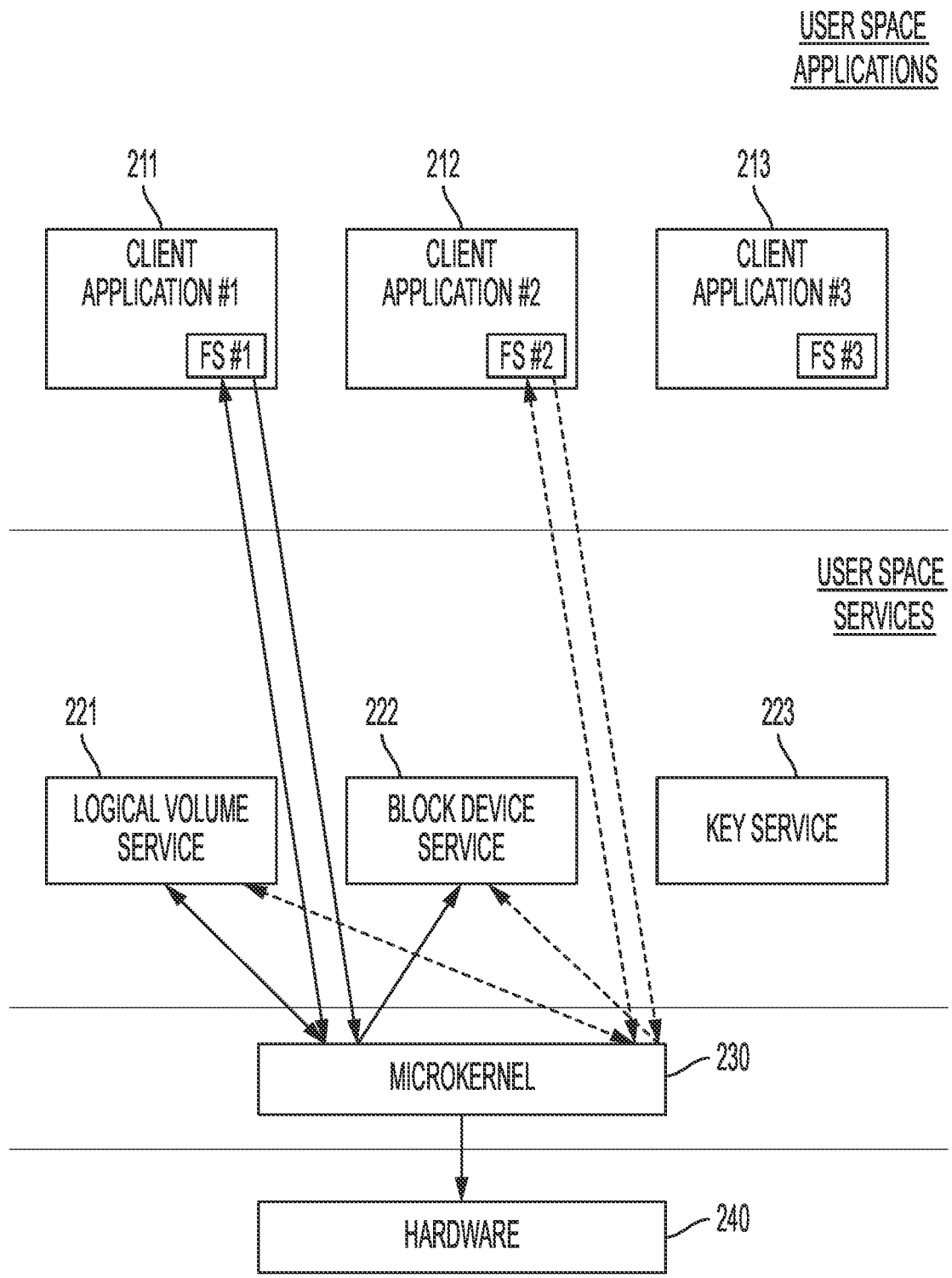
FIG. 2 illustrates an example of client applications running on a computing device according to certain embodiments.

To overcome some of the above difficulties, in certain embodiments a data storage system, such as a file system library or key value store, can be instantiated or located within the application. In other words, the data storage system, such as the file system library or the key value store, can be included within the application process. Instead of using a centralized file server 121 as shown in FIG. 1, one or more applications can instantiate data storage systems, such as file system libraries or key value stores, associated with the operating system as shown in FIG. 2. FIG. 2 illustrates an example of applications running on a computing device according to certain embodiments. In particular, FIG. 2 illustrates hardware 240, microkernel 230, and block device service 222, which correspond to hardware 140, microkernel 130, and block device service 122. Unlike FIG. 1, however, FIG. 2 does not have a centralized file server presented as a user space service. Rather, in FIG. 2 client applications 211, 212, and 213 are each instantiated with their own file system library and/or key value store associated with the operating system. The file libraries can be virtual file system client libraries. Placing the file system library or key value store within the application itself can allow the one or more applications to access block device service 222 using a single IPC channel. This can allow the client application to request access to the persistent storage device using a single IPC channel.

In certain embodiments, an application, such as client applications 211, 212, and 213 can start as a first process within a user space of an operating system. The application can instantiate a file system library and/or key value store associated with the operating system, as shown in FIG. 2. A block device service 222 can then start as a second process within the user space of the operating system. The client application can wish to access data located within the underlying persistent storage device. The client application, such as client application 211, can internally communicate with its file storage library, retrieve an appropriate memory address, and transmit a system call request to the microkernel. Microkernel 230, as such, receives a system call request from the application to communicate with block device service 222 through an IPC channel. The system call request includes an access request to access the persistent storage device. In response to the received system call request, microkernel 230 can forward or send the request to block device service 222, and provide the client application with access to block device service 222 through the IPC channel.

In certain embodiments, the file system host can be removed as a separate/central component, and each file system library and/or key value store can be instantiated within the application's own process. As shown in FIG. 2, doing so can allow the client application to interact with the disk driver or persistent storage device via a single IPC channel. In embodiments that utilize only a single IPC channel the number of resources used by the host can be reduce, further reducing system overhead and saving resources. The IPC channel can utilize a shared memory region between the data storage system of the client application and the block device service.

The data storage system, such as the file system library and/or key value store, being instantiated within the client application, as shown in the embodiment of FIG. 2, can help to provide secure communication between applications 211, 212, or 213 and block device service 222. When using a centralized file server as shown in FIG. 1, client applications 111, 112, and 113 transmit decrypted requests using an IPC channel through the microkernel to file server 121. Once the requests are received at centralized file server 121, the request can be encrypted and transmitted to block device service 122. In the embodiment shown in FIG. 2, on the other hand, in which the file system library is located within client applications 211, 212, and 213, the request can be encrypted as part of the client application process. In other words, each client application can encrypt its own data with its own key. Any request or message transmitted from the client application over the IPC channel to block device service 222 can therefore be encrypted. As such, having the data storage system, such as the file system library and/or key value store, located instantiated in the application process not only helps to reduce the system overhead and number of resources exhausted by the computing device, but also helps to provide for secure, encrypted communication between the client application and the block device service. The transmitted encrypted data can then be stored at block device 222. In some embodiments, the client application that originally wrote the encrypted data may be the only one that can decrypt the data.

As discussed above, in certain embodiments each client application can encrypt its own data using an individualized key. The data stored in the data storage system, such as file system library, of each client application can be encrypted using the key. The key can be provided to the client application during initial set up by a key service 223. For example, if a first client application encrypts its data with a first key, a second client application that does not have access to the first key can not be able to access the data. Two or more client applications who share data can use a shared key to encrypt data, with each of the client applications having access to the shared key. In some other embodiments, applications can share data using a separate IPC channel without sharing their encryption keys.

To help manage the data storage system located in the different client applications, logical volume service 221, also referred to as a storage service, can be used. Logical volume service 221 can be a user space service that is a separate process running outside microkernel 230. In certain embodiments, during set-up the client application can send a request to logical volume service 221. Logical volume service 221 can help to set up an IPC channel through microkernel 230 between client application 211, 212, or 213 and the block device service 222. In other words, when an application is allocated one or more data blocks representing a virtual disk provided to a given client application, logical volume service 221 can open an IPC channel to block device service 222 on behalf of the client application. The allocated data blocks can be associated with the IPC channel, which can be used by block device service 222 to translate incoming data block addresses to disk-relative block addresses when servicing input/output requests. Once the IPC channel between the client application and block device service is connected, the client application can access the persistent storage device via the block device service without having to communicate with the logical volume service.

The persistent storage device of the computing device can include one or more data blocks, on which data can be read or written by the client application. The one or more data blocks can represent a virtual disk provided to one or more client applications. Logical volume service 221 can help to allocate, reserve, or assign one or more data blocks or resource blocks at the persistent storage device of the computing device to the one or more applications. In other words, logical volume service 221 can help to partition the disk drive, disk device, or persistent storage device discrete logical regions. For example, a first client application can be assigned data blocks 1-9 of the persistent storage device, such as a disk drive of a computing device, to which the first client application can read, write, or discard. The data blocks can be virtual blocks that can map to persistent storage device, disk drive, or disk device. Data blocks 1-9 can be either exclusively reserved to a single client application or shared amongst a plurality of client applications. In some embodiments, a data block can be exclusively reserved to a single client application for writing on the data block, while a data block can be shared amongst a plurality of client applications for reading the data block. After the one or more data blocks are allocated, logical volume service 221 can inform block device service 222 of the allocation.

In the above example, a first client application 211 can be assigned data blocks 1-9 of the disk drive or disk device. In one non-limiting example, data blocks 1-9 can translate to 4-8 megabits segment of the persistent storage device space or disk space. A second client 212 can then send a request to logical volume service 221 during its set-up. In response to the request, logical volume service 221 can assign second client 212 data blocks 10-18. Block device service 222 can be informed that the first client application was allocated data blocks 1-9 and the second client application was allocated data blocks 10-18. The allocated data blocks belonging to a given application can be treated as a virtual disk. In certain embodiments, a given application can be allowed to read and/or write only to those data blocks that have been allocated to them.

In some embodiments, first client 211 can be in need of additional resources from the persistent storage device. To obtain additional resources, first client 211 can transmit or send a message to logical volume service 221 requesting additional data blocks. Logical volume service 221 can then determine whether to allocate the additional data blocks, and how many additional data blocks to allocate. For example, when logical volume service 221 receives a request for additional data blocks from first client 211, logical volume service 221 can allocate data blocks 19-27 to first client 211. Logical volume service 221 can keep records of all the data block allocations it has granted.

In certain embodiments, block device service 222 can be charged with enforcing the allocation of the data blocks. For example, if a third client application 213 attempts to access any of data blocks 1-9, block device service 222 can deny the third client application 213 access because data blocks 1-9 have already been reserved by first client application 211. When one or more data blocks are reserved for first client 211, those data blocks can be locked for first client 211. In another example, block device service 222 can temporarily grant the third client application 213 access to one or more of data blocks 1-9.

In certain embodiments, block device service 222 can negotiate between client applications to allow access to one or more shared data blocks. For example, logical volume service 221 can allocate first client application 211 data blocks 1-9, while allocating second client application 212 shared blocks data 4-6. While first client application 211 can primarily own or utilize data blocks 1-9, second client application 212 can transmit a request to block device service 222 requesting permission to read data block 5. Block device service 222 can transmit a notification to first client application 211 that another client application is seeking to use data block 5. In some embodiments, block device service 222 can simply reject the request of second client application 212. In another embodiment, block device service 222 can accept the request of second client application 212 and restrict first client application 211 for a permanent or temporary amount of time. In one non-limiting example, upon receiving the notification transmitted by block device service 222 the first client application 211 can relinquish access and/or be restricted from accessing data block 5.

In other embodiments, however, block device service 222 can inform first client application 211 that it will be restricted or blocked from accessing data block 5. First client application 211 can be restricted or blocked until second client application 212 reads or writes data block 5. For example, block device service 222 can employ a timer and inform first client application 211 that it will be restricted from accessing data block 5 until after the timer expires. After the timer lapses first client application 211 can transmit a request to block device service 222 requesting to regain access to data block 5. Block device service 222 can then reallocate data block 5 to first client application 211. In another embodiments, however, after the timer lapses block device service 222 can automatically grant first client application 211 access to data block 5.

Block device service 222 can negotiate between client applications who request access to the same data block. For example, block device service 222 can determine to grant access to whichever client applications needs access to the data block the most. In making such a determination, block device service 222 can utilize a priority scheme that can help the block device service determine which client application request for access should be granted first. For example, the priority scheme can be block device service 222 giving priority to whichever client application has more requests internally queued with block device service 222. In certain embodiments, the negotiation performed by block device service 222 can require a finite amount of time. A pause can be inserted to allow for the negotiation. For example, once a request is received by second client application 212 to access data block 5 a timer can be initiated. Until the timer expires, data block 5 will remain accessible to first client application 211 to allow for block device service 222 to undergo negotiation.

In certain embodiments each data storage system can have an internal cache or queue of requests transmitted by the data storage system to block device service 222. In other words, when a request for access is transmitted by the client applications to block device service 222 the request can be placed in a queue. Any other request for access can be placed in a queue behind the initial request. Once a given request is denied or granted by block device service 222, the request can be removed from the queue. The queue of transmitted, received, and/or completed application requests can be kept internally in block device service 222 and/or in the application itself.

Figure 3:
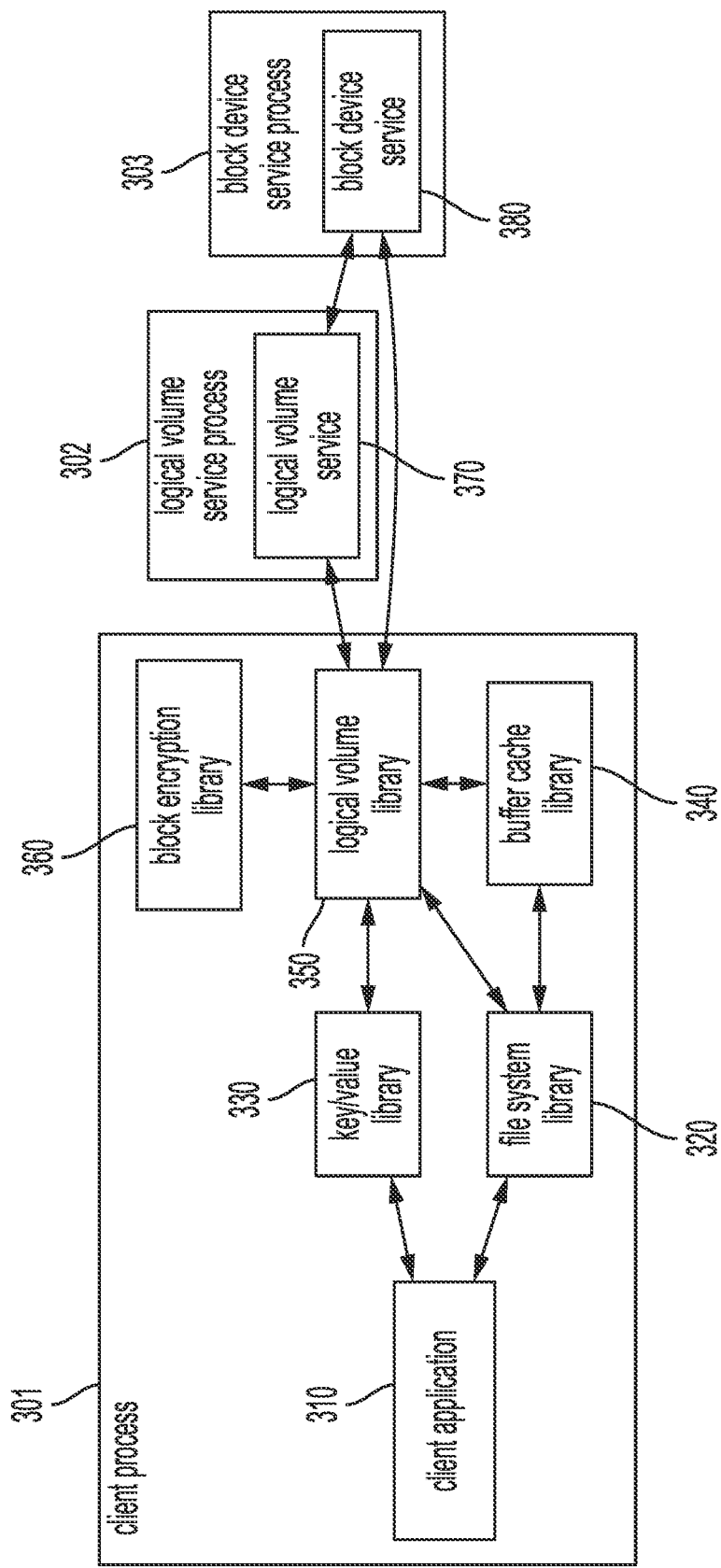
FIG. 3 illustrates an example of a flow diagram according to certain embodiments.

FIG. 3 illustrates an example of a flow diagram according to certain embodiments. In particular, FIG. 3 illustrates client process 301 that can include application 310 corresponding to client application 211 shown in FIG. 2. Client process 301 can include client application 310, key/value store/library 330, and file system library 320. In certain embodiments key/value store/library 330 and/or file system library 320 can be included within client application 310. File system library 320 can include a buffer cache library 340, as discussed above, and/or a logical volume library 350. Logical volume library 350 can be responsible for translating input or output requests from volume-related logical block addresses to disk-related physical addresses. Logical volume library 350 can interact with block encryption library 360 and buffer cache library 340. Using the translation provided for in logical volume library 350, the client process can communicate directly with block device service 303 to perform actual disk input/output.

Logical volume library 350 can communicate with logical volume service process 302 and block device service process 303, which can include logical volume service 221 and block device service 222, respectively. Logical volume service process 302 can be responsible for managing dynamically resizable logical volumes, or dynamic partitions, for use by file system and structured storage clients. Block device service process 303 can be responsible for communicating with hardware block devices, and exposing a block read/write/discard interface to the layers above.

Figure 4:
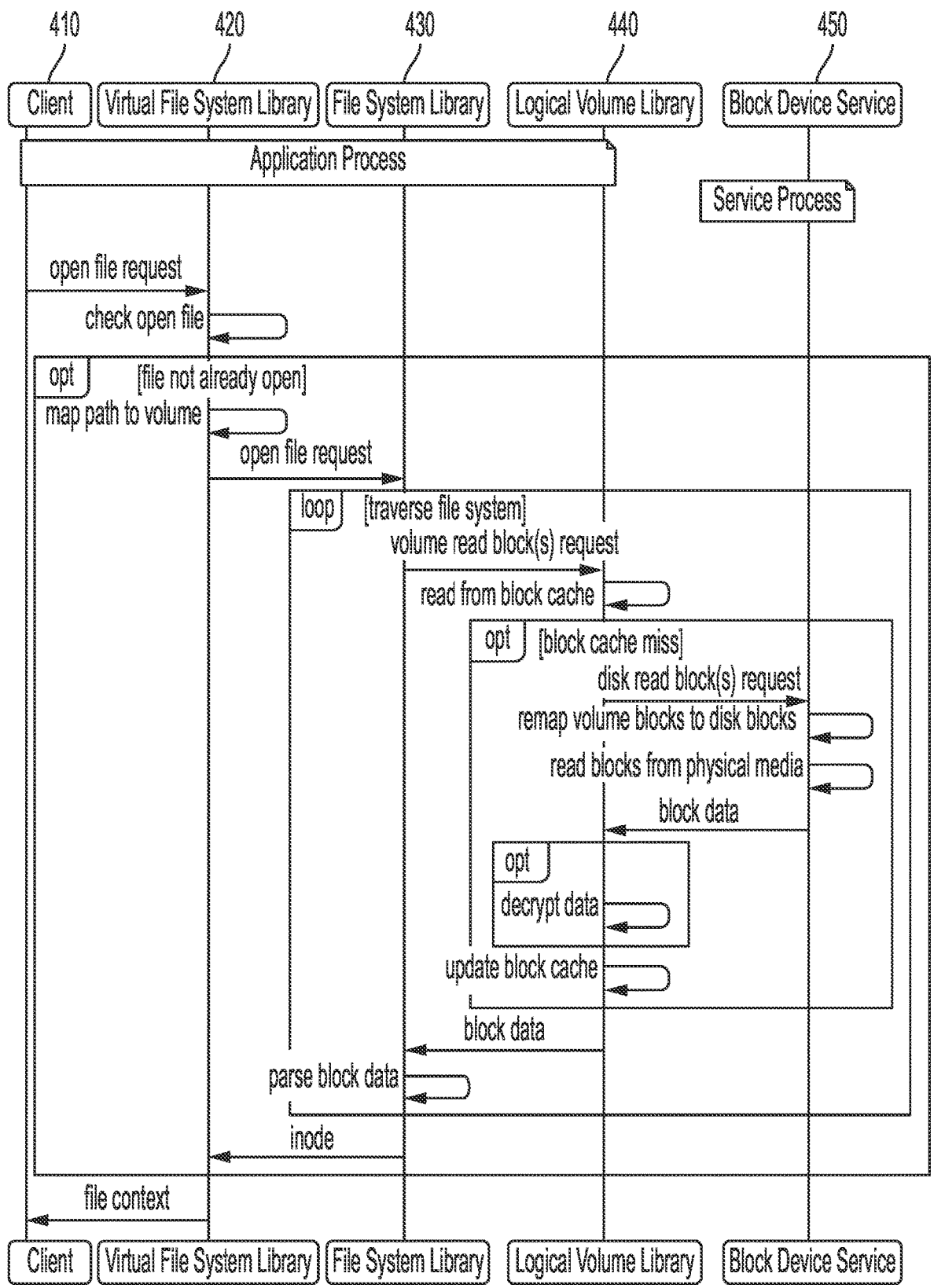
FIG. 4 illustrates an example of a system flow diagram according to certain embodiments.

FIG. 4 illustrates an example of a system flow diagram according to certain embodiments. In particular, FIG. 4 illustrates an operation in which a client requests to open a file. Client 410 can correspond to applications 211, 212, and 213. Client 410, virtual file system library 420, file system library 430, and logical volume library 440 can all be included in the client application process, while block device service 450 can be a separate service located in the user space.

As shown in FIG. 4, client 410 can send an open file request to virtual file system library 420. Virtual file system library 420 can check to determine whether the files are already open. If the virtual file system library 420 determines that the file was not already open, virtual file system library 420 can attempt to map a path to the volume. The volume can be the one or more data blocks that have been previously allocated to client application 410. Virtual file system library 420 can then send an open file request to file system library 430. File system library 430, which can be instantiated in client application 410, can transmit a volume read block request to logical volume library 440. Logical volume library 440 can then attempt to read the block cache. If the file is not found in the block cache, logical volume library 440 can transmit a disk read block request to block device service 450.

Block device service 450 can map volume blocks to disk blocks and read blocks from the physical media, such as a persistent storage device. Block device service 450 can then transmit the block data to logical volume library 440. If the data is encrypted, the logical volume library 440 can proceed to decrypt the data. Logical volume library 440 can update block cache with the decrypted data, and transmit the block data to file library system 430. File system library 430 can parse block data and transmit the data in the form of a file system node data structure to virtual file system library 420. The file context can be transmitted from virtual file system library 420 to client 410.

Figure 5:
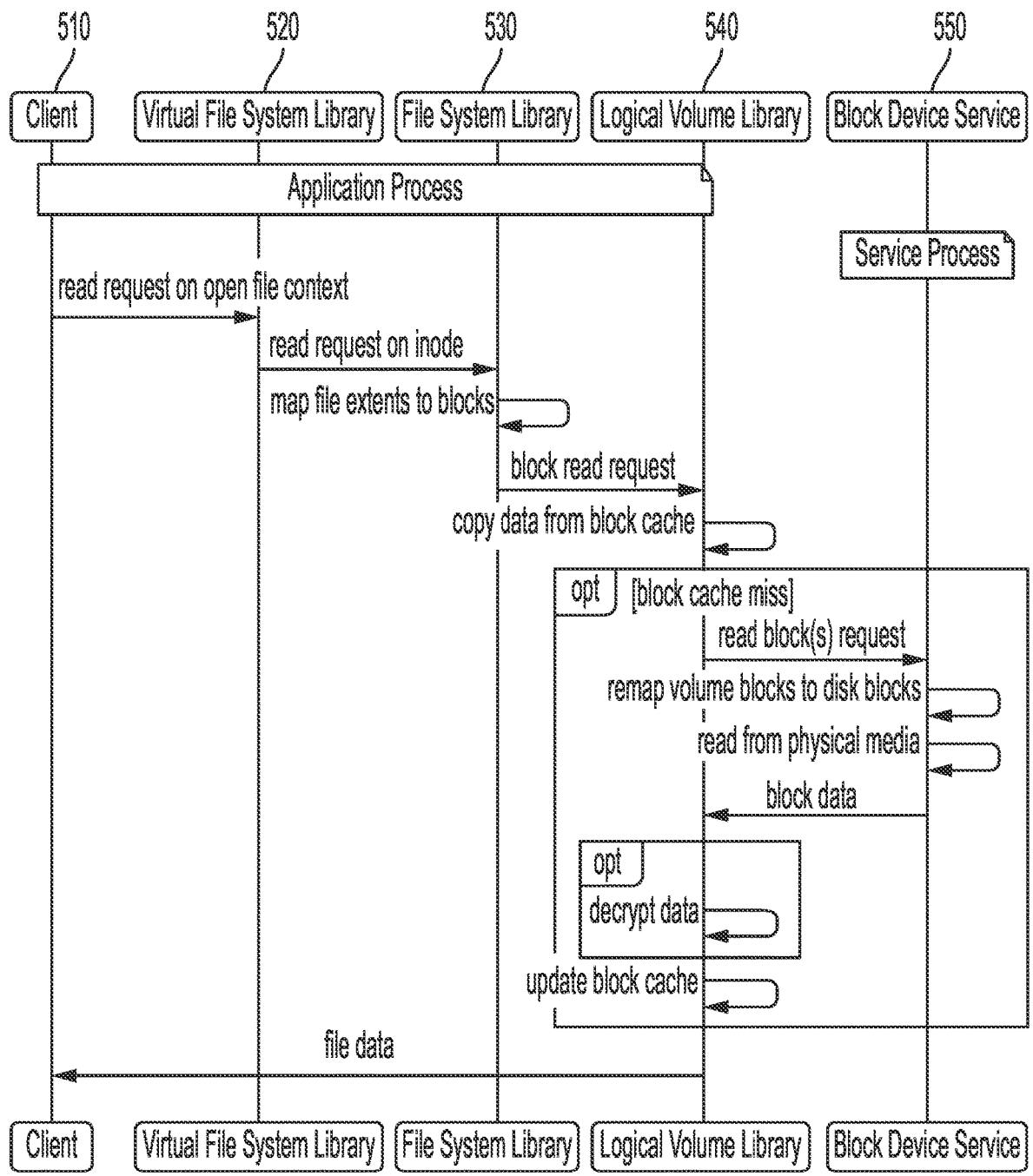
FIG. 5 illustrates an example of a system flow diagram according to certain embodiments.

FIG. 5 illustrates an example of a system flow diagram according to certain embodiments. In particular, FIG. 5 illustrates an operation in which a client requests to read a file. Client 510 can correspond to applications 211, 212, and 213. Client 510, virtual file system library 520, file system library 530, and logical volume library 540 can all be included in the client application process, while block device service 550 can be a separate service located in the user space. As shown in FIG. 5, client 510 can send a read request for an open file context to virtual file system library 520. Virtual file system library 520 can transmit a read request on file system node. File system library 530 can then attempt to map file extents to blocks, and send a block read request to logical volume library 540. Logical volume library 540 can try to copy the data from the block cache. If logical volume library 540 fails to copy the data from the block cache, logical volume library 540 can transmit a read block request to block device service 550. Block device service 550 can remap volume blocks to disk blocks, and read the remapped blocks from the physical media. As shown in FIG. 5, block device service 550 can transmit block data to logical volume library 540. If the block data is encrypted, logical volume library 540 can decrypt the data. Logical volume library 540 can use the decrypted data to update the block cache. After updating the block cache, logical volume library 540 can transmit the file data to client 510.

Figure 6:
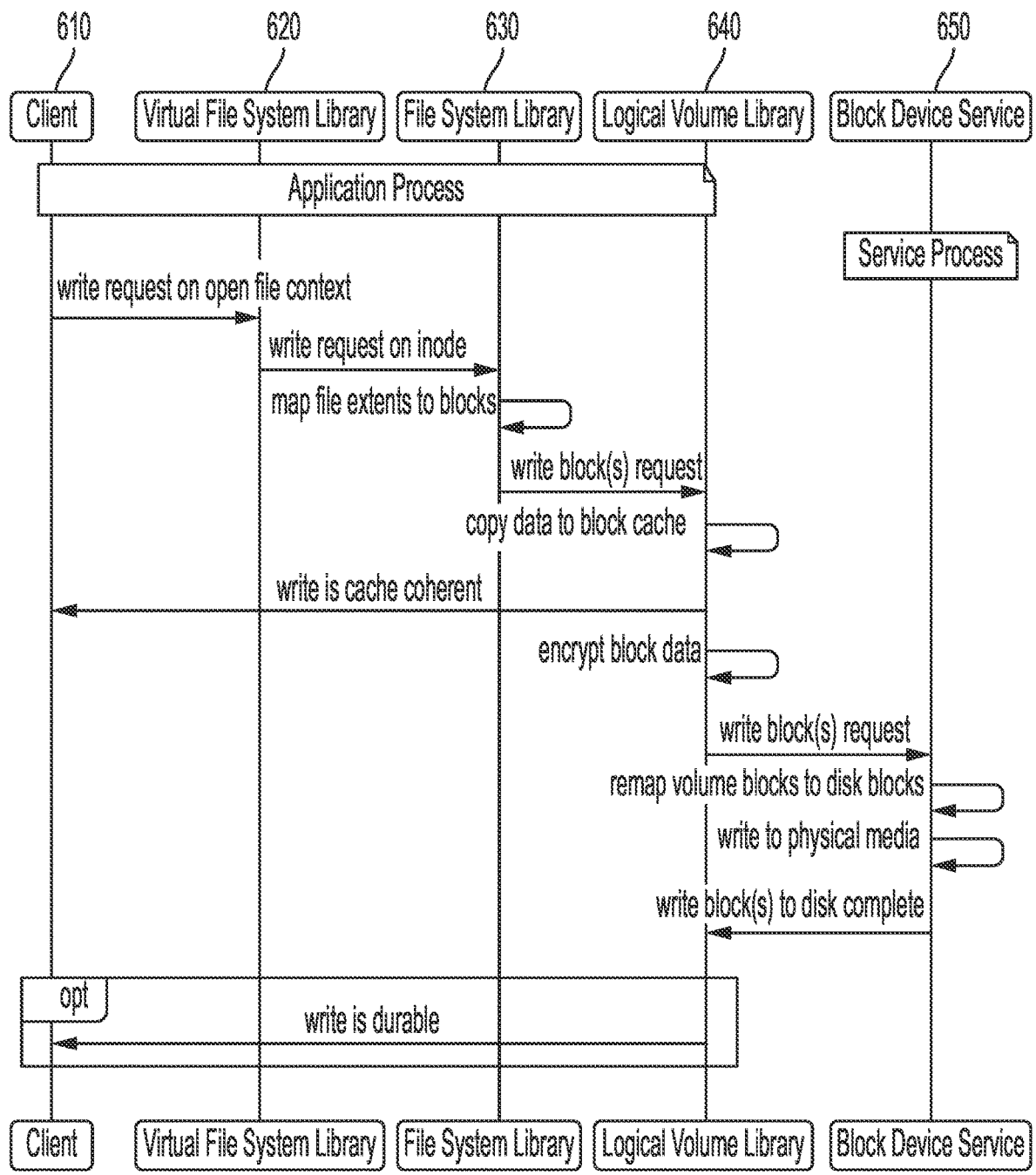
FIG. 6 illustrates an example of a system flow diagram according to certain embodiments.

FIG. 6 illustrates an example of a system flow diagram according to certain embodiments. In particular, FIG. 6 illustrates an operation in which a client requests to write on a disk drive or disk device. Client 610, virtual file system library 620, file system library 630, and logical volume library 640 can all be included in the client application process, while block device service 650 can be a separate service located in the user space. Client 610 can correspond to applications 211, 212, and 213. Client application 610 can transmit a write request for opening file context to virtual file system library 620. Virtual file system library 620 can send the write request on file system node to file system library 630. File system library 630 can attempt to map file extent to blocks. File system library 630 can transmit a write block request to logical volume library 640. Logical volume library 640 can then attempt to copy data to the block cache.

In certain embodiments logical volume library 640 can inform client application 610 that the write cache is coherent. Logical volume library 640 can then attempt to encrypt the block data. A write block request can be transmitted from logical volume library 640 to block device service 650. Block device service 650 can remap the volume blocks to the disk blocks, and write the remapped blocks to the physical media. Block device service 650 can notify logical volume library 640 that the block write to the disk was complete. A notification that the write is durable can then be transmitted from logical volume library 640 to client 610, through file system library 630 and virtual file system library 620.

Figure 7:
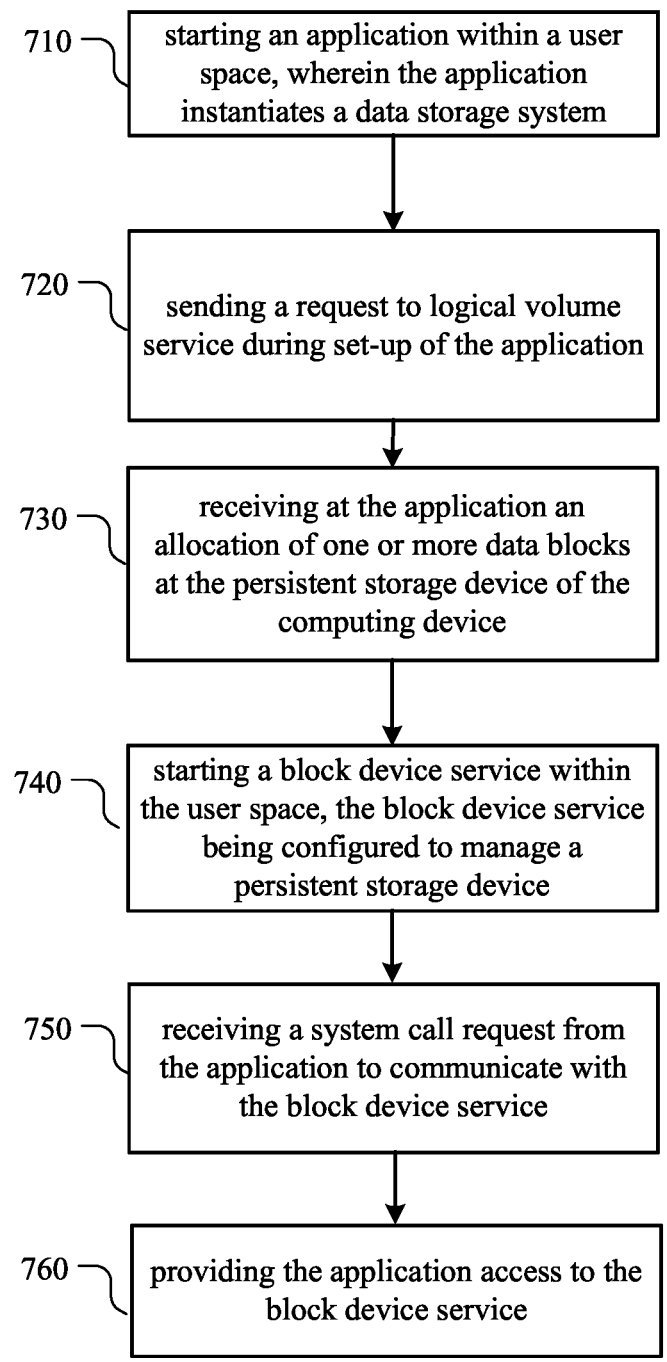
FIG. 7 illustrates an example of a flow diagram according to certain embodiments.

FIG. 7 illustrates an example of a flow diagram according to certain embodiments. In particular, FIG. 7 illustrates an example of a method performed by the computing device that runs the operating system, as shown in FIG. 2. In step 710, an application, also referred to as a client application, can start as a first process within a user space of an operating system. The application can instantiate a file system library associated with the operating system. In step 720, a request can be sent to the logical volume service during set-up of the application. In step 730, the application can receive an allocation of one or more data blocks at the persistent storage device of the computing device. The logical volume service can inform the block device service of the allocation of the one or more data blocks at the persistent storage device. In certain embodiments, the logical volume service coordinates the one or more data blocks of the application with one or more other data blocks allocated to another application operating as a third process within the user space of the operating system. The block device service can be sufficiently secure to interface with hardware of the host computing device.

In step 740, the block device service can start within the user space. The block device service can be configured to manage a persistent storage device. The kernel of the operating system can receive a system call request from the application to communicate with the block device service through an IPC channel, as shown in step 750. The system call request can include an access request to access the persistent storage device. In step 760, the application can provide access to the block device service through the IPC channel in response to the system call request. In some embodiments, when needed the application can send an additional access request to the logical volume service. In response, the application can receive an additional allocation of one or more additional data blocks at the persistent storage device of the computing device.

In response to the system call request, the kernel can send the access request to the block device service. Once granted access, the application can read or write data on a data block of the persistent storage device based on the provided access to the block device service. In some embodiments the logical volume service can allocate one or more data blocks to two different application, referred to as an application and another application. The application and the another application can share the one or more blocks. In some embodiments the logical volume service can receive another access request from the another client to access the persistent storage device. The logical volume service can then determine to grant or deny the another access request based on an allocation of one or more data blocks at the persistent storage device. As described above with regards to FIG. 2, after the another application writes or reads to the one or more data blocks, the one or more data blocks of the persistent storage device can be reallocated to the application.

In certain embodiments, an operating system for a computing device, such as an augmented reality device, can include a persistent storage device, referred to as a disk drive or disk device, a file store service, and a key value store that are stacked together. FIG. 8 illustrates an example of a key value store running on a computing device. In particular, FIG. 8 illustrates key value store database library 810, file store service 820, also referred to as file system service, disk drive or disk device 830, and hardware 840 that stacked together. Key value store database library 810 can be similar to key/value library 330 in FIG. 3. As shown in FIG. 8, the key value store database library 810 can be stacked on top of file store service or system 820, meaning that file store service 820 serves as an intermediary between the key value store database library 810 and the disk driver 830. File store service 820 and disk driver 830 can both be located in the kernel space. In other embodiments, file store service 820 and/or disk driver 830 can be user space services.

Certain embodiments described below can help to reduce the amount of resources used by the stacked storage shown in FIG. 8. Specifically, there can be high overhead and wasted input/output cycles due to read or write amplification effect of the file system and flash translation layer. To help lower the amount of overhead, and to reduce the number of wasted input/output cycles and the metadata updates, some embodiments can allow the key value store library to bypass the file store service and directly communicate with the disk driver. For example, key value store database library 810 can communicate with disk driver 830 via a single IPC channel. Given the direct communication between key value store database library 810 and disk driver 830, in certain embodiments file store service 820 can be completely removed. On the other hand, in certain embodiments the file store service 820 and/or key value store database library 810, each having direct communication with disk driver 830, can be used by a client application. Allowing the key value store database library 810 to communicate with disk driver 830 can help to reduce the number of resources used by the computing device.

Key value store database library 810 can be a database that uses an array or hash table to store and retrieve data. The array or hash table, for example, can include a key associated with a value. The key can be an arbitrary data blob assigned by the client, while the associated value can be any form of data or payload. Unlike a file store library, in certain key value store database libraries no indexing and/or multiplexing of the data can be performed, and there can be no directory structure. Instead, the key value store can have a searchable index of keys associated with an application. In one non-limiting example, the keys in the index can be tied to an application identifier, which can be used to search the index. Once the key is found and the associated payload retrieved, the payload can be used to inform the application of the location of the one or more data blocks of the persistent storage device it has been allocated. In certain embodiments, the key value store can include an internal structure indicating its location in the persistent storage device.

Figure 9:
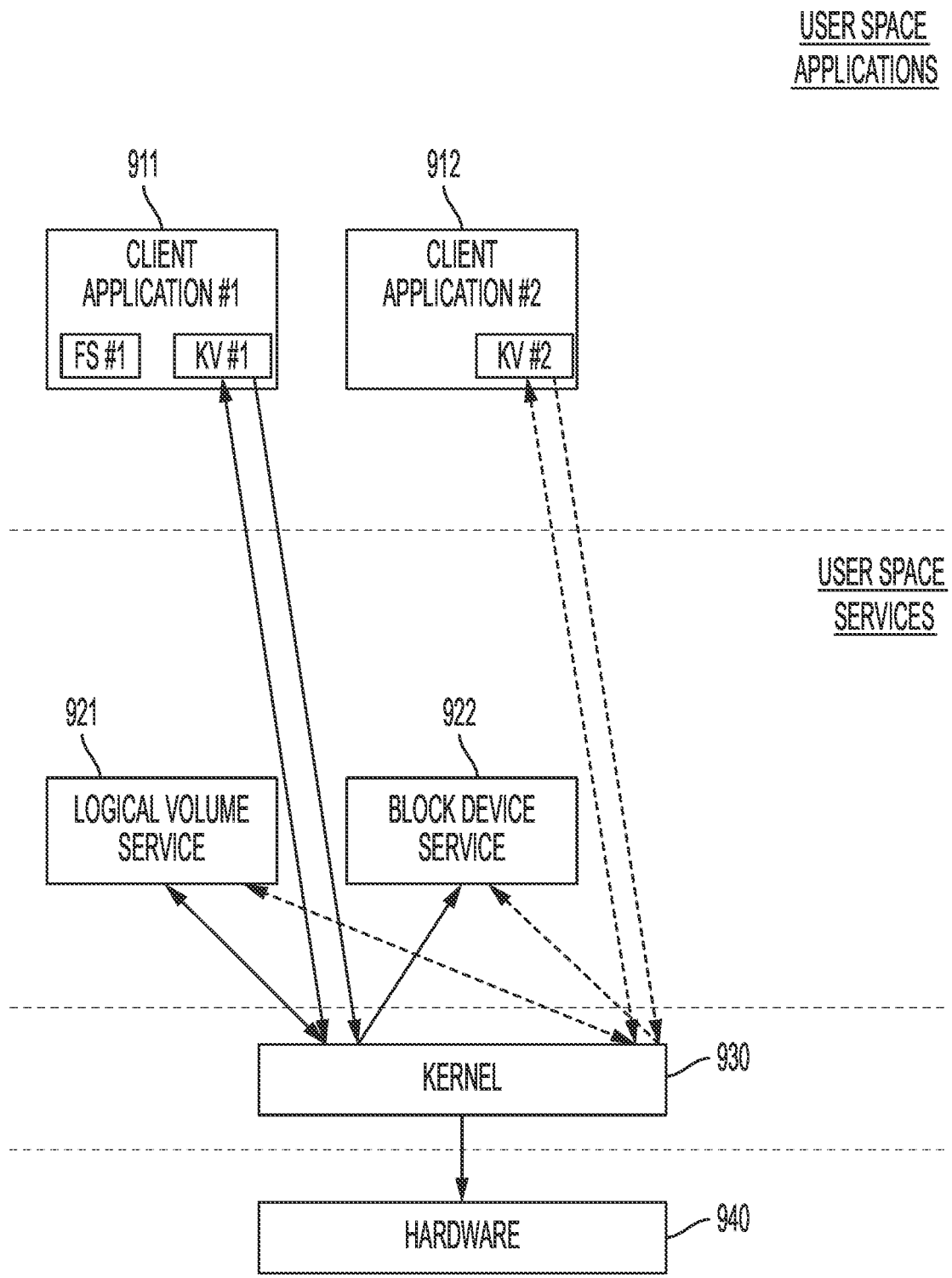
FIG. 9 illustrates an example of client applications running on a computing device.

FIG. 9 illustrates an example of client applications running on a computing device. In particular, FIG. 9 shows a non-limiting embodiment in which the key value store data base can be instantiated within the client application. In other embodiments, not shown in FIG. 9, the key value store data base can be a user space service located outside the client application. Application 911, also referred to as client application, can include both a key value store database library and a file system library. Application 911 can therefore select whether to interface with storage via the key value store/library and/or a separate file system library, or any other data storage system. In certain embodiments each data storage system can be allocated different data blocks. For example, the key value store/library and the file system library can be allocated different data blocks of the disk drive or disk device. In other words, the file system library and key value store can each be allocated or assigned a certain range of the blocks, which can be referred to as a volume or partition. The range of blocks assigned to the file system library and key value store could be dis-contiguous. Unlike application 911, application 912 can include only a key value store.

In certain embodiments, applications 911 and/or 912 can start as a first process within a user space of an operating system. During set-up applications 911 and/or 912 can send a request to a logical volume service 921. Applications 911, 912 can then receive from logical volume service 921 an allocation of first or second one or more data blocks at the persistent storage of the computing device, such as a disk driver. In some embodiments, the application can instantiate the key-value store and/or a file system associated with the operating system. In other embodiments, the key value store associated with the operating system can be a user space service located outside the client application.

The key value store can help to manage the one or more data blocks allocated to the application. The one or more data blocks can represent a virtual disk provided to a given client application. The virtual disk can have an identifier that indicates whether the disk is being managed by a file system and/or a key value store. In certain embodiments the key value store can map a virtual storage space to one or more data blocks within the allocated portion or partition of the disk drive that was assigned to the application. This can allow the client application to read and/or write to the persistent storage, such as the disk drive or disk device, using only the key value store without use of the file storage system.

Kernel 930 of the operating system, in some embodiments, can receive a system call request generated by the key value store or the file system. The system call request can include an access request to access a persistent storage of the computing device. The system call can be received and/or transmitted through the IPC channel. In one non-limiting example, kernel 930 can be a microkernel. In another non-limiting example, the kernel can be a monolithic kernel. As shown in FIG. 9, the IPC channel can connect the key value store to block devices service 922. In some embodiments, block device service 922, logical volume service 921, kernel 930, and hardware 940 can correspond to block device service 222, logical volume service 221, kernel 230, and hardware 240.

In certain embodiments, block device service 922 can start as a second process within the user space of the operating system. The block device service can be configured to manage a persistent storage device of the computing device. In other words, the block device service can be used to manage one or more first data blocks of a persistent storage allocated to the key value store, and one or more second data blocks of the persistent storage allocated to the file system. The key value store or the file system can provide, in response to the system call request, access to the block device service through the IPC channel. For example, the key value store can be granted access to the one or more first data blocks or the file system can be granted access to the one or more second data blocks. The one or more first and second data blocks can be different from one another, and can be mapped to different parts of the persistent storage device of the computing device. The key value store can be granted access to the persistent storage. The key value store can provide the application access to the persistent storage of the computing device, which can be referred to as a persistent storage device, such as a disk drive or disk device.

As discussed above, the key value store can be allocated one or more first data blocks. In certain embodiments, the entire persistent storage device, such as a disk drive or disk device, can be allocated to the key value store. The key value store can treat the disk drive as one file, with values of the key value store being mapped onto the one or more allocated data blocks as discrete partitions of the one file. In some embodiments, the size of each of the one or more data blocks managed by the key value store can be kept large, reducing the number of partitions of the disk drive. For example, the blocks can range between 64 kilobytes and 1 megabytes. Alternatively, the blocks can be any other range within the disk drive. This can allow the key value store to better manage the persistent storage device. In one non-limiting example, the key value store can use a log-structured merge-tree. Using a log-structured merge-tree can allow for writing large, sequential data blocks, which can be beneficial to reducing flash write operations, leading to improved performance and flash part longevity.

Figure 10:
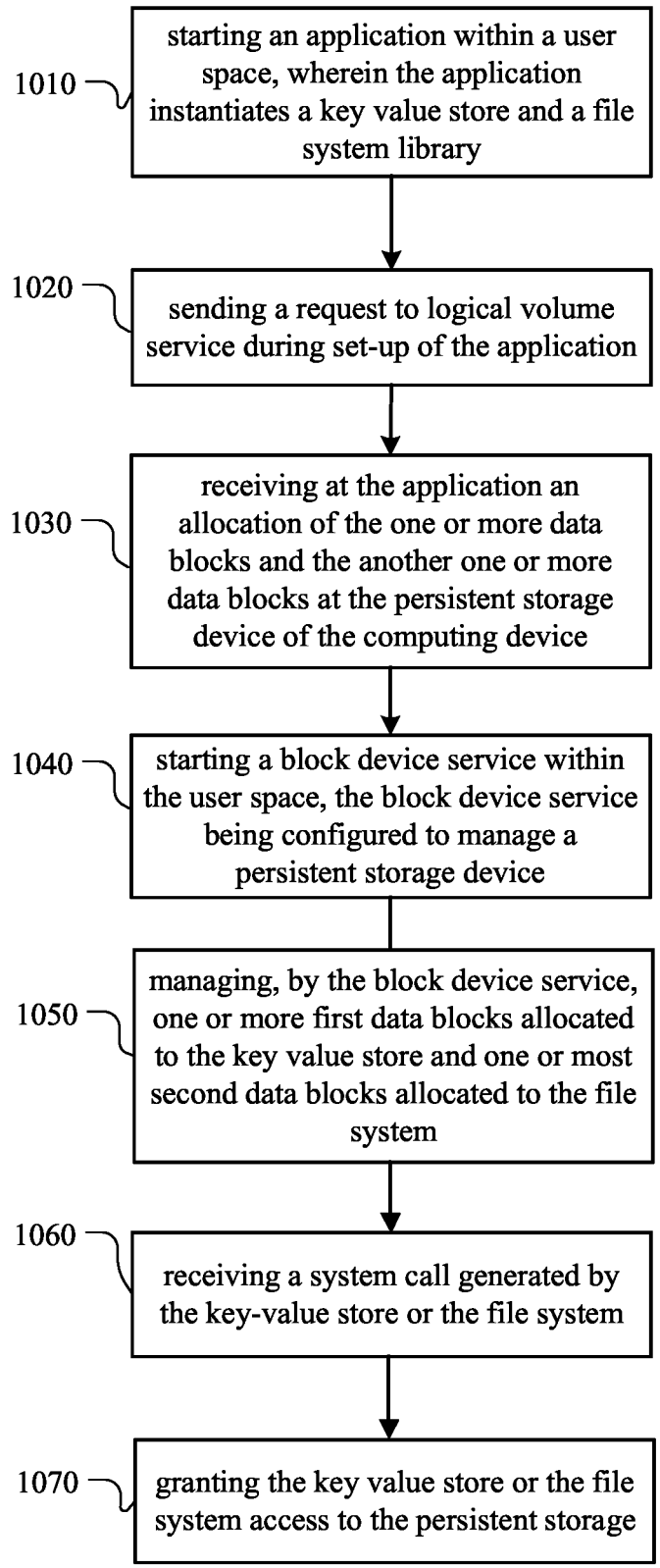
FIG. 10 illustrates an example of a flow diagram according to certain embodiments.

FIG. 10 illustrates an example of a flow diagram according to certain embodiments. In particular, FIG. 10 illustrates an example of a method performed by the computing device that runs the operating system, for example, as shown in FIG. 9. In step 1010 an application can start as a first process within a user space of an operating system. The application can instantiate a key-value store and a file system associated with the operating system. In step 1020, a request can be sent to the logical volume service during set-up of the application. In step 1030, the application can receive an allocation of the first one or more data blocks at the persistent storage of the computing device for the key value store, and the second one or more data blocks at the persistent storage device for the file system. In step 1040, a block device service can be started as a second process within the user space of the operating system. The logical volume service can inform the block device service of the allocation of the one or more first data blocks and the one or more second data blocks at the persistent storage device. In certain embodiments, the block device service can be configured to manage a persistent storage of the computing device. In response to the system call request, the key value store and the file system can provide access to the one or more first data blocks or the one or more second data blocks through an IPC channel. In step 1050, the block device service running as the second process within the user space of the operating system can manage the one or more first data blocks of the persistent storage allocated to the key value store, and one or more second data blocks of the persistent storage allocated to the first system.

The kernel of the operating system can receive a system call request generated by the key value store or the file system, as shown in step 1060. The system call request can include an access request to access the persistent storage of the computing device. In some embodiments, the system call request can be received via an IPC channel. The kernel can be a microkernel or a monolithic kernel. In step 1070, the block device service can, in response to the access request, grant the key value store access to the one or more first data blocks or the file system access to the one or more second data blocks. The first data blocks can be a first range of data blocks, while the one or more second data blocks can be a range of second range of data blocks. The key value store can then be used to read or write data on the one or more first data blocks of the persistent storage device, while the file system can be used to read or write on the one or more second data blocks of the persistent storage device. In one non-limiting example, the key value store can manage the one or more data blocks using a log-structured merge-tree. An application, in some non-limiting embodiments, can select or choose between the key value store or the file system library based on which one or more first or second data blocks it would like to access, read, and/or write.

Particular embodiments can repeat one or more steps of the method of FIGS. 7 and 10, where appropriate. Although this disclosure describes and illustrates particular steps of the methods of FIGS. 7 and 10 as occurring in a particular order, this disclosure contemplates any suitable steps of the methods of FIGS. 7 and 10 occurring in any suitable order. Moreover, although this disclosure describes and illustrates an example method for accessing physical hardware according to certain embodiments including the steps of the methods shown in FIGS. 7 and 10, this disclosure contemplates any suitable method for accessing physical hardware according to certain embodiments including any suitable steps, which can include all, some, or none of the steps of the methods of FIGS. 7 and 10, where appropriate. Furthermore, although this disclosure describes and illustrates particular components, devices, or systems carrying out particular steps of the methods of FIGS. 7 and 10, this disclosure contemplates any suitable combination of any suitable components, devices, or systems carrying out any suitable steps of the methods of FIGS. 7 and 10.

Figure 11:
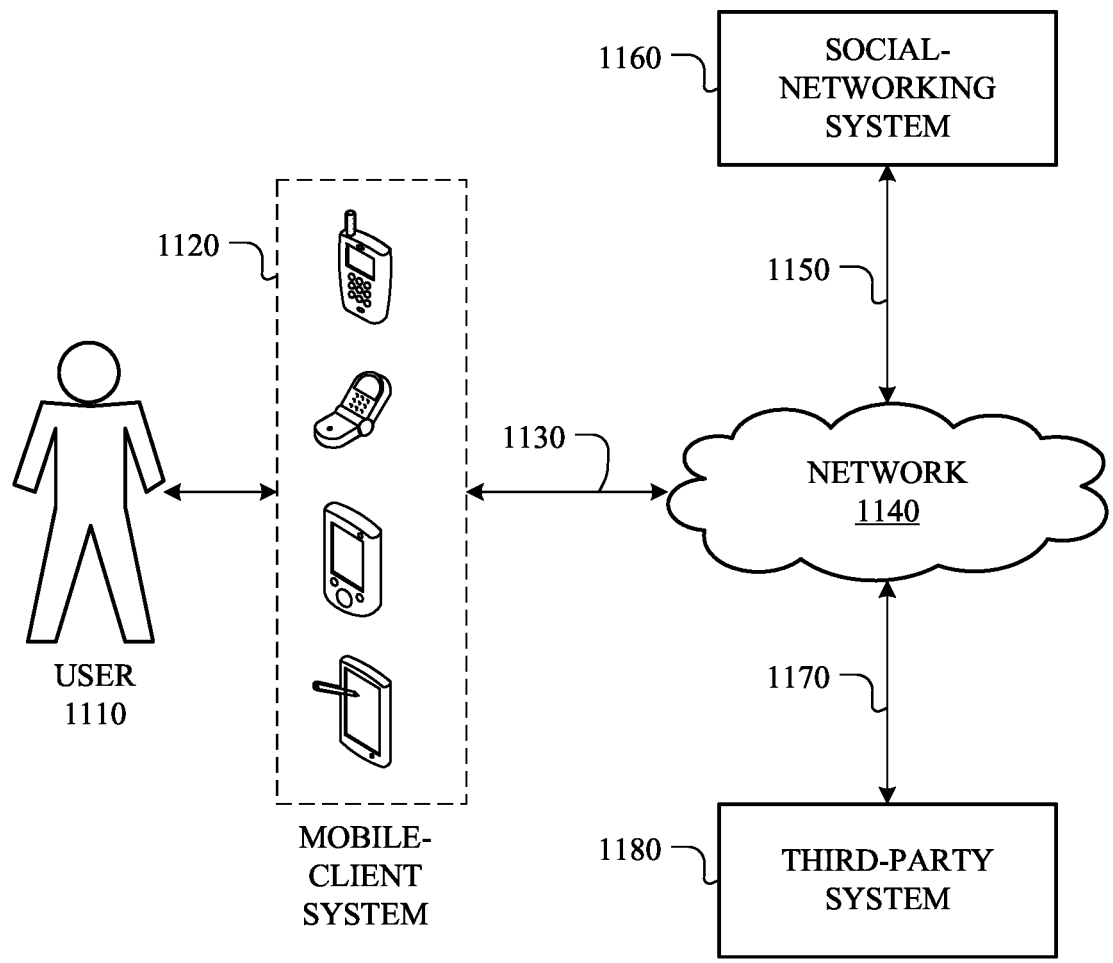
FIG. 11 illustrates an example network environment associated with a social-networking system.

FIG. 11 illustrates an example network environment 1100 associated with a social-networking system. In particular, network environment 1100 can include a computing device on which the virtual machine and virtual hardware components, including the virtual drivers, can operate. Network environment 1100 includes a user 1110, a client system 1120, a social-networking system 1160, and a third-party system 1180 connected to each other by a network 1140, via connections 1150 and 1170. Connection 1130 is used to connect network 1140 and mobile-client system 1120. Although FIG. 11 illustrates a particular arrangement of user 1110, client system 1120, social-networking system 1160, third-party system 1180, and network 1140, this disclosure contemplates any suitable arrangement of user 1110, client system 1120, social-networking system 1160, third-party system 1180, and network 1140. As an example and not by way of limitation, two or more of client system 1120, social-networking system 1160, and third-party system 1180 can be connected to each other directly, bypassing network 1140. As another example, two or more of client system 1120, social-networking system 1160, and third-party system 1180 can be physically or logically co-located with each other in whole or in part. Moreover, although FIG. 11 illustrates a particular number of users 1110, client systems 1120, social-networking systems 1160, third-party systems 1180, and networks 1140, this disclosure contemplates any suitable number of users 1110, client systems 1120, social-networking systems 1160, third-party systems 1180, and networks 1140. As an example and not by way of limitation, network environment 1100 can include multiple users 1110, client system 1120, social-networking systems 1160, third-party systems 1180, and networks 1140.

In particular embodiments, user 1110 can be an individual (human user), an entity (e.g., an enterprise, business, or third-party application), or a group (e.g., of individuals or entities) that interacts or communicates with or over social-networking system 1160. In particular embodiments, social-networking system 1160 can be a network-addressable computing system hosting an online social network. Social-networking system 1160 can generate, store, receive, and send social-networking data, such as, for example, user-profile data, concept-profile data, social-graph information, or other suitable data related to the online social network. Social-networking system 1160 can be accessed by the other components of network environment 1100 either directly or via network 1140. In particular embodiments, social-networking system 1160 can include an authorization server (or other suitable component(s)) that allows users 1110 to opt in to or opt out of having their actions logged by social-networking system 1160 or shared with other systems (e.g., third-party systems 1180), for example, by setting appropriate privacy settings. A privacy setting of a user can determine what information associated with the user can be logged, how information associated with the user can be logged, when information associated with the user can be logged, who can log information associated with the user, whom information associated with the user can be shared with, and for what purposes information associated with the user can be logged or shared. Authorization servers can be used to enforce one or more privacy settings of the users of social-networking system 1160 through blocking, data hashing, anonymization, or other suitable techniques as appropriate. In particular embodiments, third-party system 1180 can be a network-addressable computing system that can host a gaming application that uses AR or VR. Third-party system 1180 can generate, store, receive, and send system data, such as, for example, data related to the gaming application. Third-party system 1180 can be accessed by the other components of network environment 1100 either directly or via network 1140. In particular embodiments, one or more users 1110 can use one or more client systems 1120 to access, send data to, and receive data from social-networking system 1160 or third-party system 1180. Client system 1120 can access social-networking system 1160 or third-party system 1180 directly, via network 1140, or via a third-party system. As an example and not by way of limitation, client system 1120 can access third-party system 1180 via social-networking system 1160. Client system 1120 can be any suitable computing device, such as, for example, a personal computer, a laptop computer, a cellular telephone, a smartphone, a tablet computer, or an augmented/virtual reality device.

This disclosure contemplates any suitable network 1140. As an example and not by way of limitation, one or more portions of network 1140 can include an ad hoc network, an intranet, an extranet, a virtual private network (VPN), a local area network (LAN), a wireless LAN (WLAN), a wide area network (WAN), a wireless WAN (WWAN), a metropolitan area network (MAN), a portion of the Internet, a portion of the Public Switched Telephone Network (PSTN), a cellular telephone network, or a combination of two or more of these. Network 340 can include one or more networks.

Links or channels 1150, 1170 can connect client system 1120, social-networking system 1160, and third-party system 1180 to communication network 1140 or to each other. Link 1130 connects mobile-client system 1120 and network 1140. This disclosure contemplates any suitable links 1130, 1150, 1170. In particular embodiments, one or more links 1130, 1150, 1170 can include one or more wireline (such as for example Digital Subscriber Line (DSL) or Data Over Cable Service Interface Specification (DOCSIS)), wireless (such as for example Wi-Fi or Worldwide Interoperability for Microwave Access (WiMAX)), or optical (such as for example Synchronous Optical Network (SONET) or Synchronous Digital Hierarchy (SDH)) links. In particular embodiments, one or more links 1130, 1150, 1170 can each include an ad hoc network, an intranet, an extranet, a VPN, a LAN, a WLAN, a WAN, a WWAN, a MAN, a portion of the Internet, a portion of the PSTN, a cellular technology-based network, a satellite communications technology-based network, another link 1130, 1150, 1170, or a combination of two or more such links 1130, 1150, 1170. Links 1130, 1150, 1170 need not necessarily be the same throughout network environment 1130, 1150, 1170. One or more first links 1130, 1150, 1170 can differ in one or more respects from one or more second links 1130, 1150, 1170.

Figure 12:
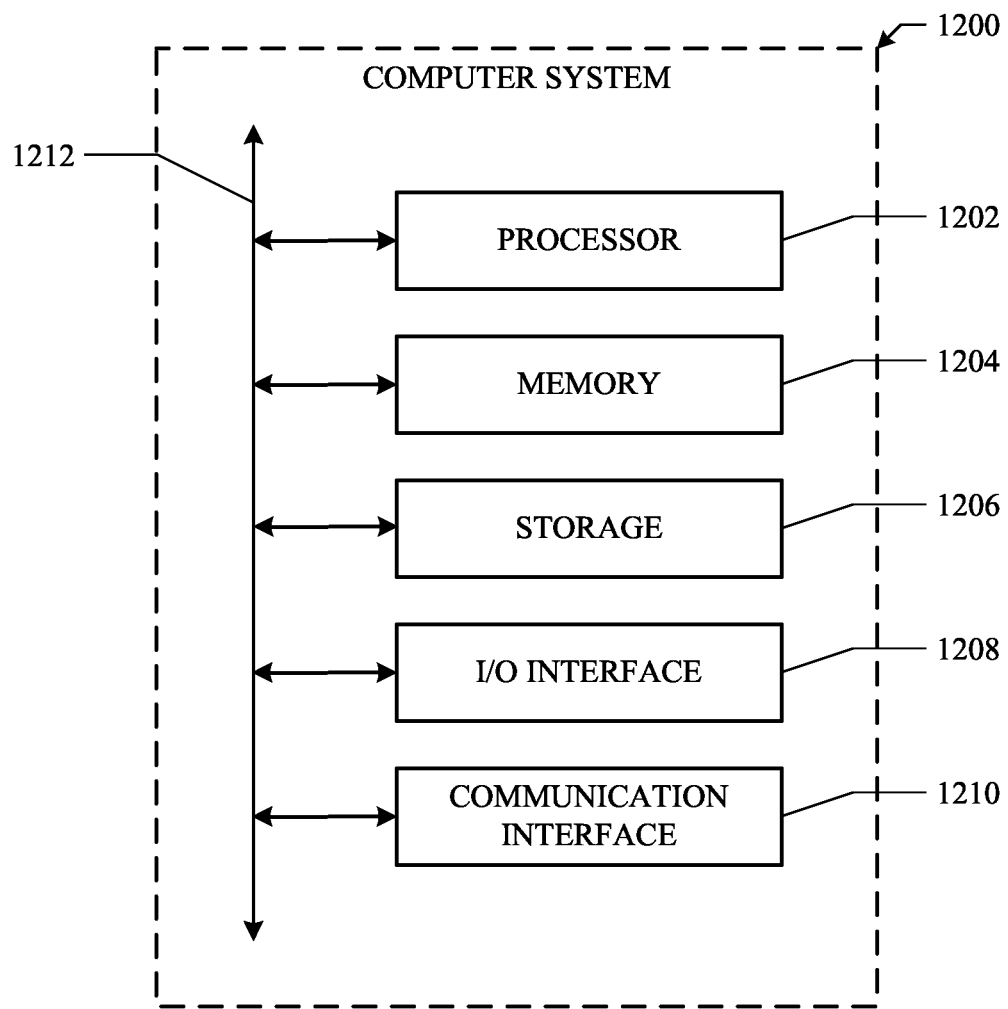
FIG. 12 illustrates an example computer device and/or computer system.

FIG. 12 illustrates an example computer system 1200. In particular embodiments, one or more computer systems 1200 perform one or more steps of one or more methods described or illustrated herein. In some embodiments, one or more computer systems 1200 provide functionality described or illustrated herein. In certain embodiments, software running on one or more computer systems 1200 performs one or more steps of one or more methods described or illustrated herein or provides functionality described or illustrated herein. Particular embodiments include one or more portions of one or more computer systems 1200. Herein, reference to a computer system can encompass a computing device, and vice versa, where appropriate. Moreover, reference to a computer system can encompass one or more computer systems, where appropriate.

This disclosure contemplates any suitable number of computer systems 1200. This disclosure contemplates computer system 1200 taking any suitable physical form. As example and not by way of limitation, computer system 1200 can be an embedded computer system, a system-on-chip (SOC), a single-board computer system (SBC) (such as, for example, a computer-on-module (COM) or system-on-module (SOM)), a desktop computer system, a laptop or notebook computer system, an interactive kiosk, a mainframe, a mesh of computer systems, a mobile telephone, a personal digital assistant (PDA), a server, a tablet computer system, an augmented/virtual reality device, or a combination of two or more of these. Where appropriate, computer system 1200 can include one or more computer systems 1200; be unitary or distributed; span multiple locations; span multiple machines; span multiple data centers; or reside in a cloud, which can include one or more cloud components in one or more networks. Where appropriate, one or more computer systems 1200 can perform without substantial spatial or temporal limitation one or more steps of one or more methods described or illustrated herein. As an example and not by way of limitation, one or more computer systems 1200 can perform in real time or in batch mode one or more steps of one or more methods described or illustrated herein. One or more computer systems 1200 can perform at different times or at different locations one or more steps of one or more methods described or illustrated herein, where appropriate.

In particular embodiments, computer system 1200 includes a processor 1202, memory 1204, storage 1206, an input/output (I/O) interface 1208, a communication interface 1210, and a bus 1212. Although this disclosure describes and illustrates a particular computer system having a particular number of particular components in a particular arrangement, this disclosure contemplates any suitable computer system having any suitable number of any suitable components in any suitable arrangement.

In particular embodiments, processor 1202 includes hardware for executing instructions, such as those making up a computer program. As an example and not by way of limitation, to execute instructions, processor 1202 can retrieve (or fetch) the instructions from an internal register, an internal cache, memory 1204, or storage 1206; decode and execute them; and then write one or more results to an internal register, an internal cache, memory 1204, or storage 1206. In particular embodiments, processor 1202 can include one or more internal caches for data, instructions, or addresses. This disclosure contemplates processor 1202 including any suitable number of any suitable internal caches, where appropriate. As an example and not by way of limitation, processor 1202 can include one or more instruction caches, one or more data caches, and one or more translation lookaside buffers (TLBs). Instructions in the instruction caches can be copies of instructions in memory 1204 or storage 1206, and the instruction caches can speed up retrieval of those instructions by processor 1202. Data in the data caches can be copies of data in memory 1204 or storage 1206 for instructions executing at processor 1202 to operate on; the results of previous instructions executed at processor 1202 for access by subsequent instructions executing at processor 1202 or for writing to memory 1204 or storage 1206; or other suitable data. The data caches can speed up read or write operations by processor 1202. The TLBs can speed up virtual-address translation for processor 1202. In particular embodiments, processor 1202 can include one or more internal registers for data, instructions, or addresses. This disclosure contemplates processor 1202 including any suitable number of any suitable internal registers, where appropriate. Where appropriate, processor 1202 can include one or more arithmetic logic units (ALUs); be a multi-core processor; or include one or more processors 1202. Although this disclosure describes and illustrates a particular processor, this disclosure contemplates any suitable processor.

In particular embodiments, memory 1204 includes main memory for storing instructions for processor 1202 to execute or data for processor 1202 to operate on. As an example and not by way of limitation, computer system 1200 can load instructions from storage 1206 or another source (such as, for example, another computer system 1200) to memory 1204. Processor 1202 can then load the instructions from memory 1204 to an internal register or internal cache. To execute the instructions, processor 1202 can retrieve the instructions from the internal register or internal cache and decode them. During or after execution of the instructions, processor 1202 can write one or more results (which can be intermediate or final results) to the internal register or internal cache. Processor 1202 can then write one or more of those results to memory 1204. In particular embodiments, processor 1202 executes only instructions in one or more internal registers or internal caches or in memory 1204 (as opposed to storage 1206 or elsewhere) and operates only on data in one or more internal registers or internal caches or in memory 1204 (as opposed to storage 1206 or elsewhere). One or more memory buses (which can each include an address bus and a data bus) can couple processor 1202 to memory 1204. Bus 1214 can include one or more memory buses, as described below. In particular embodiments, one or more memory management units (MMUs) reside between processor 1202 and memory 1204 and facilitate accesses to memory 404 requested by processor 1202. In particular embodiments, memory 1204 includes random access memory (RAM). This RAM can be volatile memory, where appropriate. Where appropriate, this RAM can be dynamic RAM (DRAM) or static RAM (SRAM). Moreover, where appropriate, this RAM can be single-ported or multi-ported RAM. This disclosure contemplates any suitable RAM. Memory 1204 can include one or more memories 404, where appropriate. Although this disclosure describes and illustrates particular memory, this disclosure contemplates any suitable memory.

In particular embodiments, storage 1206 includes mass storage for data or instructions. As an example, and not by way of limitation, storage 1206 can include a hard disk drive (HDD), a floppy disk drive, flash memory, an optical disc, a magneto-optical disc, magnetic tape, or a Universal Serial Bus (USB) drive or a combination of two or more of these. Storage 406 can include removable or non-removable (or fixed) media, where appropriate. Storage 406 can be internal or external to computer system 1200, where appropriate. In particular embodiments, storage 1206 is non-volatile, solid-state memory. In particular embodiments, storage 1206 includes read-only memory (ROM). Where appropriate, this ROM can be mask-programmed ROM, programmable ROM (PROM), erasable PROM (EPROM), electrically erasable PROM (EEPROM), electrically alterable ROM (EAROM), or flash memory or a combination of two or more of these. This disclosure contemplates mass storage 1206 taking any suitable physical form. Storage 1206 can include one or more storage control units facilitating communication between processor 1202 and storage 1206, where appropriate. Where appropriate, storage 1206 can include one or more storages 1206. Although this disclosure describes and illustrates particular storage, this disclosure contemplates any suitable storage.

In particular embodiments, I/O interface 1208 includes hardware, software, or both, providing one or more interfaces for communication between computer system 1200 and one or more I/O devices. Computer system 1200 can include one or more of these I/O devices, where appropriate. One or more of these I/O devices can enable communication between a person and computer system 1200. As an example and not by way of limitation, an I/O device can include a keyboard, keypad, microphone, monitor, mouse, printer, scanner, speaker, still camera, stylus, tablet, touch screen, trackball, video camera, another suitable I/O device or a combination of two or more of these. An I/O device can include one or more sensors. This disclosure contemplates any suitable I/O devices and any suitable I/O interfaces 1208 for them. Where appropriate, I/O interface 1208 can include one or more device or software drivers enabling processor 1202 to drive one or more of these I/O devices. I/O interface 1208 can include one or more I/O interfaces 408, where appropriate. Although this disclosure describes and illustrates a particular I/O interface, this disclosure contemplates any suitable I/O interface.

In particular embodiments, communication interface 1210 includes hardware, software, or both providing one or more interfaces for communication (such as, for example, packet-based communication) between computer system 1200 and one or more other computer systems 1200 or one or more networks. As an example and not by way of limitation, communication interface 1210 can include a network interface controller (NIC) or network adapter for communicating with an Ethernet or other wire-based network or a wireless NIC (WNIC) or wireless adapter for communicating with a wireless network, such as a WI-FI network. This disclosure contemplates any suitable network and any suitable communication interface 1210 for it. As an example and not by way of limitation, computer system 1200 can communicate with an ad hoc network, a personal area network (PAN), a local area network (LAN), a wide area network (WAN), a metropolitan area network (MAN), or one or more portions of the Internet or a combination of two or more of these. One or more portions of one or more of these networks can be wired or wireless. As an example, computer system 1200 can communicate with a wireless PAN (WPAN) (such as, for example, a BLUETOOTH WPAN), a WI-FI network, a WI-MAX network, a cellular telephone network (such as, for example, a Global System for Mobile Communications (GSM) network), or other suitable wireless network or a combination of two or more of these. Computer system 1200 can include any suitable communication interface 1210 for any of these networks, where appropriate. Communication interface 410 can include one or more communication interfaces 1210, where appropriate. Although this disclosure describes and illustrates a particular communication interface, this disclosure contemplates any suitable communication interface.

In particular embodiments, bus 1212 includes hardware, software, or both coupling components of computer system 1200 to each other. As an example and not by way of limitation, bus 414 can include an Accelerated Graphics Port (AGP) or other graphics bus, an Enhanced Industry Standard Architecture (EISA) bus, a front-side bus (FSB), a HYPERTRANSPORT (HT) interconnect, an Industry Standard Architecture (ISA) bus, an INFINIBAND interconnect, a low-pin-count (LPC) bus, a memory bus, a Micro Channel Architecture (MCA) bus, a Peripheral Component Interconnect (PCI) bus, a PCI-Express (PCIe) bus, a serial advanced technology attachment (SATA) bus, a Video Electronics Standards Association local (VLB) bus, or another suitable bus or a combination of two or more of these. Bus 1212 can include one or more buses 1212, where appropriate. Although this disclosure describes and illustrates a particular bus, this disclosure contemplates any suitable bus or interconnect.

Herein, a computer-readable non-transitory storage medium or media can include one or more semiconductor-based or other integrated circuits (ICs) (such, as for example, field-programmable gate arrays (FPGAs) or application-specific ICs (ASICs)), hard disk drives (HDDs), hybrid hard drives (HHDs), optical discs, optical disc drives (ODDs), magneto-optical discs, magneto-optical drives, floppy diskettes, floppy disk drives (FDDs), magnetic tapes, solid-state drives (SSDs), RAM-drives, SECURE DIGITAL cards or drives, any other suitable computer-readable readable non-transitory storage media, or any suitable combination of two or more of these, where appropriate. A computer-readable non-transitory storage medium can be volatile, non-volatile, or a combination of volatile and non-volatile, where appropriate.

Herein, "or" is inclusive and not exclusive, unless expressly indicated otherwise or indicated otherwise by context. Therefore, herein, "A or B" means "A, B, or both," unless expressly indicated otherwise or indicated otherwise by context. Moreover, "and" is both joint and several, unless expressly indicated otherwise or indicated otherwise by context. Therefore, herein, "A and B" means "A and B, jointly or severally," unless expressly indicated otherwise or indicated otherwise by context.

The scope of this disclosure encompasses all changes, substitutions, variations, alterations, and modifications to the example embodiments described or illustrated herein that a person having ordinary skill in the art would comprehend. The scope of this disclosure is not limited to the example embodiments described or illustrated herein. Moreover, although this disclosure describes and illustrates respective embodiments herein as including particular components, elements, feature, functions, operations, or steps, any of these embodiments can include any combination or permutation of any of the components, elements, features, functions, operations, or steps described or illustrated anywhere herein that a person having ordinary skill in the art would comprehend. Furthermore, reference in the appended claims to an apparatus or system or a component of an apparatus or system being adapted to, arranged to, capable of, configured to, enabled to, operable to, or operative to perform a particular function encompasses that apparatus, system, component, whether or not it or that particular function is activated, turned on, or unlocked, as long as that apparatus, system, or component is so adapted, arranged, capable, configured, enabled, operable, or operative. Additionally, although this disclosure describes or illustrates particular embodiments as providing particular advantages, particular embodiments can provide none, some, or all of these advantages.

What is claimed is:

1. A method comprising, by a computing device:
   starting an application as a first process within a user space of an operating system, wherein the application instantiates a key-value store library associated with the operating system, where the key-value store library is located within the application;
   starting a block device service as a second process within the user space of the operating system, the block device service being configured to manage a persistent storage device of the computing device;
   managing, by the block device service running as the second process within the user space of the operating system, one or more first data blocks of the persistent storage device allocated to the key-value store library, wherein the key-value store library manages the one or more first data blocks using a mapping between a virtual storage space and the one or more first data blocks;
   receiving, by a kernel of the operating system, a system call request generated by the key- value store library, the system call request comprising an access request to access the persistent storage device of the computing device, wherein the kernel is a microkernel;
   granting, by the block device service and in response to the access request, the key-value store library access to the one or more first data blocks; and
   providing the key-value store library, in response to the system call request, access to the one or more first data blocks through an inter process communication (IPC) channel between the application and the block device service via the kernel.

2. The method according to claim 1, further comprising:
   reading or writing data on the one or more first data blocks using the key-value store library.

3. The method of claim 1, further comprising:
   sending a request to a logical volume service during set-up of the application; and
   allocating the one or more first data blocks of the persistent storage device for the key-value store library.

4. The method of claim 3, wherein the logical volume service informs the block device service of the allocation of the one or more first data blocks.

5. The method of claim 1, wherein the key-value store library comprises an internal structure indicating a location of the one or more first data blocks in the persistent storage device.

6. The method of claim 1, wherein the application further instantiates a file system library associated with the operating system, where the file system library is located within the application.

7. The method of claim 6, further comprising:
   managing, by the block device service running as the second process within the user space of the operating system, one or more second data blocks of the persistent storage device allocated to the file system library.

8. One or more computer-readable non-transitory storage media embodying software that is operable when executed to:
   start an application as a first process within a user space of an operating system, wherein the application instantiates a key-value store library associated with the operating system, where the key-value store library is located within the application;
   start a block device service as a second process within the user space of the operating system, the block device service being configured to manage a persistent storage device of a computing device;
   manage, by the block device service running as the second process within the user space of the operating system, one or more first data blocks of the persistent storage device allocated to the key-value store library, wherein the key-value store library manages the one or more first data blocks using a mapping between a virtual storage space and the one or more first data blocks;
   receive, by a kernel of the operating system, a system call request generated by the key-value store library, the system call request comprising an access request to access the persistent storage device of the computing device, wherein the kernel is a microkernel;
   grant, by the block device service and in response to the access request, the key-value store library access to the one or more first data blocks; and
   provide the key-value store library, in response to the system call request, access to the one or more first data blocks through an inter process communication (IPC) channel between the application and the block device service via the kernel.

9. The media of claim 8, wherein the software is further operable when executed to:
   read or write data on the one or more first data blocks using the key-value store library.

10. The media of claim 8, wherein the software is further operable when executed to:
    send a request to a logical volume service during set-up of the application; and allocate the one or more first data blocks of the persistent storage device for the key-value store library.

11. The media of claim 10, wherein the logical volume service informs the block device service of the allocation of the one or more first data blocks.

12. The media of claim 8, wherein the key-value store library comprises an internal structure indicating a location of the one or more first data blocks in the persistent storage device.

13. The media of claim 8, wherein the application further instantiates a file system library associated with the operating system, where the file system library is located within the application.

14. The media of claim 13, wherein the software is further operable when executed to:
manage, by the block device service running as the second process within the user space of the operating system, one or more second data blocks of the persistent storage device allocated to the file system library.

15. A system comprising:
one or more processors; and
one or more computer-readable non-transitory storage media coupled to the one or more processors and comprising instructions operable upon execution by the one or more processors to cause the system to:
start an application as a first process within a user space of an operating system, wherein the application instantiates a key-value store library associated with the operating system, where the key-value store library is located within the application;
start a block device service as a second process within the user space of the operating system, the block device service being configured to manage a persistent storage device of a computing device;
manage, by the block device service running as the second process within the user space of the operating system, one or more first data blocks of the persistent storage device allocated to the key-value store library, wherein the key-value store library manages the one or more first data blocks using a mapping between a virtual storage space and the one or more first data blocks;
receive, by a kernel of the operating system, a system call request generated by the key-value store library, the system call request comprising an access request to access the persistent storage device of the computing device, wherein the kernel is a microkernel;
grant, by the block device service and in response to the access request, the key-value store library access to the one or more first data blocks; and
provide the key-value store library, in response to the system call request, access to the one or more first data blocks through an inter process communication (IPC) channel between the application and the block device service via the kernel.

16. The system of claim 15, wherein the processors are further operable when executing the instructions to:
read or write data on the one or more first data blocks using the key-value store library.

17. The system of claim 15, wherein the processors are further operable when executing the instructions to:
send a request to a logical volume service during set-up of the application; and
allocate the one or more first data blocks of the persistent storage device for the key-value store library.

18. The system of claim 17, wherein the logical volume service informs the block device service of the allocation of the one or more first data blocks.

19. The system of claim 15, wherein the key-value store library comprises an internal structure indicating a location of the one or more first data blocks in the persistent storage device.

20. The system of claim 15, wherein the application further instantiates a file system library associated with the operating system, where the file system library is located within the application.

* * * * *